(12) United States Patent
Merom et al.

(10) Patent No.: US 9,773,229 B2
(45) Date of Patent: Sep. 26, 2017

(54) SYSTEMS AND METHODS FOR PROVIDING CONTACT GROUP MEMBER SUGGESTIONS

(71) Applicant: Google Inc., Mountain View, CA (US)

(72) Inventors: Ron Merom, Haifa (IL); Ari Leichtberg, Tel-Aviv (IL); Assaf Ben-David, Tel-Aviv (IL); Oded Poncz, Tel-Aviv (IL); Sigalit Bar, Mountain View, CA (US); Maayan Roth, Mountain View, CA (US); Naty Leiser, Haifa (IL); Joseph Robert Smarr, Mountain View, CA (US); Ilan Horn, Haifa (IL); David Deutscher, Haifa (IL); Guy Flysher, Tel-Aviv (IL); Yossi Matias, Tel-Aviv (IL); Tzvi Itzhak Barenholz, Tel-Aviv (IL); Hilly Meerovitch, Tel-Aviv (IL)

(73) Assignee: GOOGLE INC., Mountain View, CA (US)

( * ) Notice: Subject to any disclaimer, the term of this patent is extended or adjusted under 35 U.S.C. 154(b) by 213 days.

(21) Appl. No.: 14/069,924

(22) Filed: Nov. 1, 2013

(65) Prior Publication Data
US 2014/0122605 A1 May 1, 2014

Related U.S. Application Data

(60) Provisional application No. 61/721,460, filed on Nov. 1, 2012.

(51) Int. Cl.
*G06F 15/16* (2006.01)
*G06Q 10/10* (2012.01)
*H04L 29/08* (2006.01)

(52) U.S. Cl.
CPC .......... *G06Q 10/10* (2013.01); *H04L 67/306* (2013.01)

(58) Field of Classification Search
CPC .... G06Q 10/10; H04L 29/06; H04L 29/08072
USPC ........................................................ 709/204
See application file for complete search history.

(56) References Cited

U.S. PATENT DOCUMENTS

| 2010/0169161 A1* | 7/2010 | Sacco | G06Q 10/107 705/319 |
| 2012/0143871 A1* | 6/2012 | Liebald | G06F 17/30702 707/738 |
| 2014/0067943 A1* | 3/2014 | Jackson | G06Q 30/0269 709/204 |

* cited by examiner

*Primary Examiner* — Alan S Chou
(74) *Attorney, Agent, or Firm* — Morgan, Lewis & Bockius LLP

(57) ABSTRACT

Methods, systems, and apparatus, including computer programs for identifying, using historical interactions associated with a first user, contact groups, where the first user is associated with each contact group, are provided. A score, with respect to a second user, is calculated for each contact group based on an amount of interaction between the second user and the respective contact group, thereby deriving a plurality of scores. A first contact group is determined. The first contact group has a first score in the plurality of scores that satisfies a predetermined threshold. A contact group suggestion is generated, responsive to the determining, that comprises an invitation to add the second user to the first contact group. The first user is notified of the contact group suggestion.

21 Claims, 31 Drawing Sheets

FIG. 6B

Search  Mail  Social.Network  Videos  Books  More...

Rob McDavies
view profile

Stream

News

Videos

Circles

☐ Friends           16
☐ Family             6    660
☐ Coworkers         9

4 more ⌄

Suggestions
+ New Contact
+ New Circle

Gadgets & Games

Questions

Music

Photos

Family
My immediate family — 651
6 Members ( Stream ) ( About ) ( Photos ) ( People )

Name          Family  Edit — 654
              652

Description   My immediate family  Edit — 658
              656

People in     ☑ Can chat with you  Edit — 664
this circle:  662
              ☐ Can see your Latitude location  Edit — 668
              666

Delete this circle
672

⎫
⎬ 650
⎭

This is a personal circle

Personal circles are for
organizing the people you
know into the groups you
often share with. People
are notified when you add
them to a personal circle,
but they can't see the
circle name or its other
members.

Learn more
670

Search

SYSTEMS AND METHODS FOR PROVIDING CONTACT GROUP MEMBER SUGGESTIONS

RELATED APPLICATION

This application claims priority to U.S. Provisional Patent Application Ser. No. 61/721,460, filed Nov. 1, 2012, entitled "Contact Group Member Suggestions," which is hereby incorporated by reference in its entirety.

BACKGROUND

Some Internet based communication forums are web-based "social network" applications, in which a number of users are able to find each others' accounts and voluntarily become "friends" or "followers" of each other's posted messages. Users generally post brief messages about their status, mood, activities, and such, and their friends and followers can read and optionally reply to those messages. As such, friends may stay abreast of each other's' activities as a tool for maintaining their social bonds.

SUMMARY

The present disclosure addresses the need in the art for building social networks by providing methods, systems, and apparatus, including computer programs for identifying, using historical interactions associated with an identified (first) user, contact groups, where the identified user is associated with each contact group. A score with respect to another (second) user is calculated for each contact group based on an amount of interaction between the second user and the respective contact group, thereby deriving a plurality of scores. In this way, a first contact group is determined that has a score satisfying a predetermined threshold. A contact group suggestion is generated based on this determination. The contact group suggestion provides an invitation to add the second user to the first contact group. The identified user is notified of this contact group suggestion. As will be disclosed in further detail below, such methods, systems, and apparatus provide the opportunity to assist the identified user with development of discriminating invitations to contact groups in an automated manner and thus building a rich network of contact groups that each have appropriate participants with less effort than is required using conventional methods.

In general, innovative aspects of the subject matter described in this disclosure are embodied in methods that include the actions of identifying, using a plurality of historical interactions associated with the first user, a plurality of contact groups, wherein the first user is associated with each contact group in the plurality of contact groups; calculating a respective score, with respect to a second user, for each contact group in the plurality of contact groups, based on an amount of interaction between the second user and the respective contact group, wherein the first user and the second user are each members of a social network, thereby deriving a plurality of scores; determining a first contact group in the plurality of contact groups, wherein the first contact group has a first score in the plurality of scores that satisfies a predetermined threshold; generating a contact group suggestion, responsive to the determining, that comprises an invitation to add the second user to the first contact group, and notifying the first user of the contact group suggestion.

Other implementations of this aspect include corresponding systems, apparatus, and computer programs, configured to perform the actions of the methods, encoded on computer storage devices.

These and other implementations each optionally include one or more of the following features. For instance, the operations further include forming a plurality of implicit groups from the plurality of historical interactions, wherein each respective implicit group in the plurality of implicit groups comprises the second user and a respective third user in the social network. The operations further include: verifying that the first contact group includes a user, other than the first user and second user, that is also in an implicit group in the plurality of implicit groups. In some embodiments, at a time prior to the generating, the second user is not a member of the first contact group. In some embodiments, the first score for the first contact group satisfies the predetermined threshold when the first score is greater than a score generated for any other contact group in the plurality of contact groups. In some embodiments, the first score for the first contact group satisfies the predetermined threshold when the second user has had at least a predetermined threshold number of interactions with the first contact group during a predetermined period of time. In some embodiments, each respective interaction by the second user with the first contact group is weighted by a decayed interaction value, wherein the decayed interaction value decreases as a function of time that has elapsed since the respective interaction took place. In some embodiments, the decayed interaction value ranges from a first value, when the respective interaction by the second user with the first contact group took place within a first time period, to a second value, when the respective interaction by the second user with the first contact group took place after a second time period. In some embodiments, the plurality of historical interactions comprises posting a message or media to the social network, replying to a post on the social network, commenting on a post on the social network, clicking a user interface button to indicate a preference for a particular post on the social network, replying to an email, forwarding an email, sending an instant message, receiving an instant message, participating in an IP based video conference, sharing an electronic file over an Internet connection, or adding a contact to the social network. In some embodiments, notifying the first user of the contact group suggestion includes providing a pop-up window to the first user that includes the contact group suggestion, presenting the contact group suggestion in a designated window or area of a window, providing the contact group suggestion in a message or email to the first user, presenting the contact group suggestion in text, or presenting the contact group suggestion graphically. In some embodiments, calculating a respective score in the plurality of scores for a contact group i in the plurality of contact groups with respect to the second user j comprises computing:

$$\text{score}_{ij} = w_{1ij} \text{RCGS}_{ij} - w_{2ij} \text{IRC}_{ij}$$

wherein score$_{ij}$ is the respective score for the contact group i with respect to the second user j, RCGS$_{ij}$ is a raw contact group score for the contact group i with respect to the second user j, IRC$_{ij}$ is an implicit rejection count for the contact group i with respect to the second user j, $w_{1ij}$ is a weight for RCGS$_{ij}$, and $w_2$ is an implicit rejection multiplier for IRC$_{ij}$.

In some embodiments, w1ij is unity. In some embodiments, the operations further include: verifying, at a time prior to notifying the first user of the contact group suggestion, that the first user has not received a contact group suggestion that comprises an invitation to add the first user to the first contract group; the operations further include: repeating the scoring, determining, generating, and notifying for each second user in a plurality of second users. In some embodiments, the decayed interaction value decreases at a variable rate over time.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIG. 6B depicts a screen-shot of an example about page for a personal contact group.

FIG. 7A depicts a screen-shot of an example stream page for a shared contact group.

FIG. 7B depicts a screen-shot of an example about page for a shared contact group.

FIG. 12 depicts a screen-shot of an example stream page with a suggestion column.

Like reference numbers represent corresponding parts throughout the several drawings.

DETAILED DESCRIPTION

Figure 1:
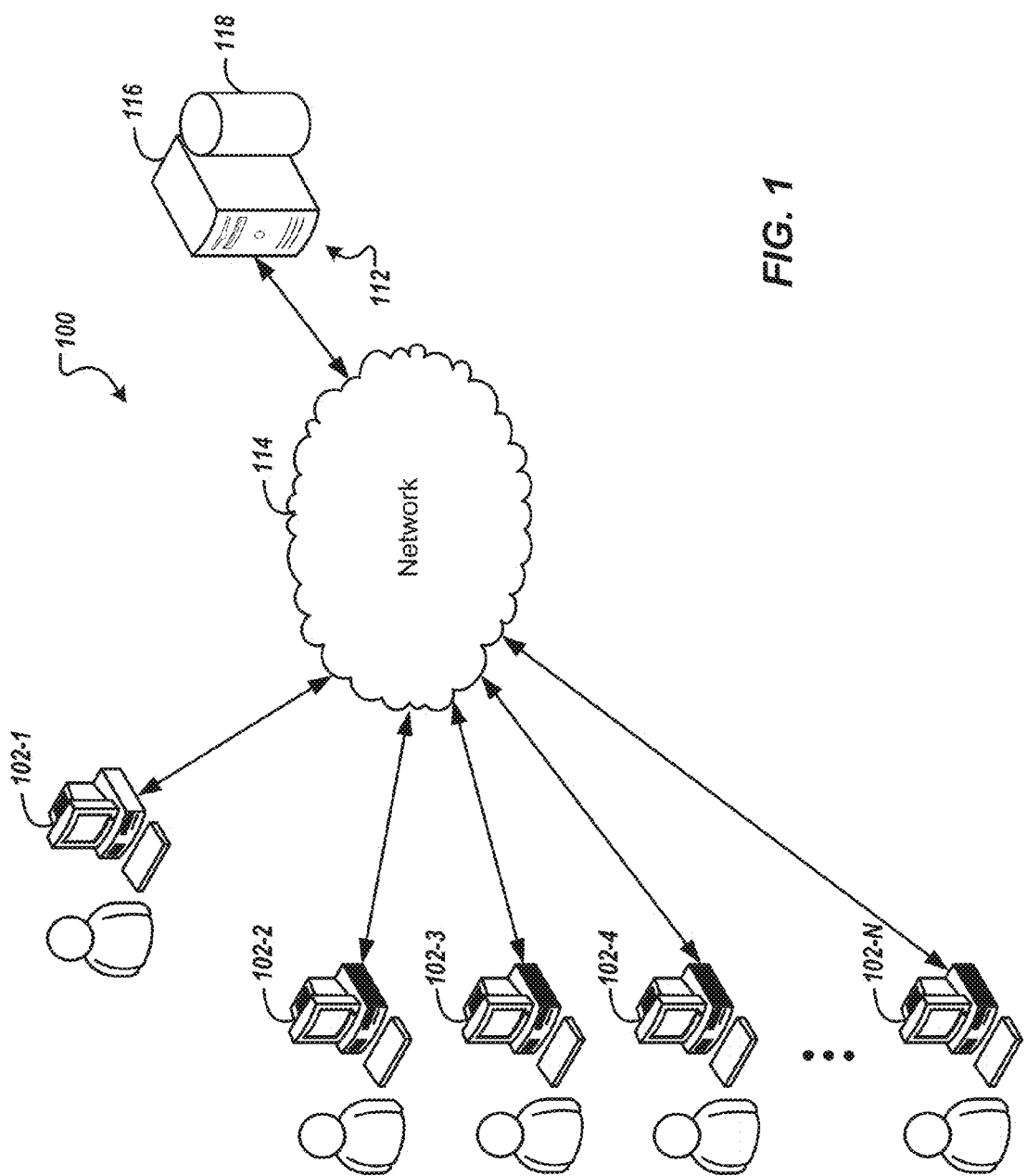
FIG. 1 is a diagram of an example network architecture.

In general, contact groups are categories to which a user can assign their social networking contacts and better control the distribution and visibility of social networking posts. In accordance with the present disclosure, a contact group is provided as a data set defining a collection of contacts that are associated with one another in a computer-implemented social networking service. Generally, a contact group can be described from the perspective of an individual that is the center of a particular collection of socially interconnected people, or from the aggregate perspective of a collection of socially interconnected people. A contact group can have narrowly defined boundaries, all of the members of the contact group may be familiar with one another, and permission may be required for a member to join a contact group. In accordance with some embodiments of the present disclosure, a user of the social networking service defines a contact group, and the contact group, as a data set defining a collection of contacts, may reflect a real-life contact group of the user. In some embodiments, a contact group can be a social circle in a social network.

Large numbers of people have embraced the use of electronic social networking services as tools for building and maintaining networks of personal, familial, academic, professional, and other interpersonal relationships. These networks can grow and overlap in ways that may give rise to new issues. One of the concerns among users of traditional social networking services is that posts that are relevant or intended for consumption by one subgroup of the user's contacts may be irrelevant, uninteresting, or even embarrassing or offensive when read by other contacts. For example, a user's contact list may include friends, coworkers, and family, and there may be some overlap among those groups (i.e., a coworker who is also considered to be a friend, a family member who is also a coworker).

In cases where the user were to simply post a message to all of his contacts using a traditional social networking service, some contacts may see posts that could be irrelevant, or embarrassing to the user, if viewed by a particular sub-group of contacts. For example, a post about a technical nuance of the user's job may be interesting to his coworkers, but uninteresting to his family. As such, the uninterested contacts may begin to ignore the user's posts, or even remove him as a contact entirely in an effort to reduce the number of uninteresting posts they see. In a more serious example, the user may post that he's "running late for work," which may be harmless if read by the user's friends, but may be personally or professionally damaging if read by his coworkers (i.e., boss) or family (i.e., mom). As such, the user of a traditional social networking service may simply choose to censor himself, not post anything and/or restrict the people he keeps on his contact lists. These options can be associated with their own drawbacks. In the case of self-censorship, the user and some of his contacts may be less freely able to exchange information and take full advantage of the social network. In the case of restricting contacts, the user may be forced to narrow the focus of his electronic social network to a selected category of contacts (i.e., to include only family, or only coworkers), which again restricts the user's ability to interact with other online contacts and take full advantage of the social networking service.

Through the creation and use of contact groups, the user can organize and categorize social networking contacts into various different groupings that can be used to control the visibility and access those contacts have to the user's postings, digital pictures, videos, audio files, hyperlinks (e.g., uniform resource indicators, URIs), and/or other content associated with the user's social networking profile. Returning to an earlier example, the user could post an update about the aforementioned technical nuance to only a "coworker" circle, and spare other contacts from seeing information that is irrelevant to them.

Furthermore, contact groups can be used to give users insight into the potential visibility of various postings before they are posted. As will be discussed below, the user may view a breakdown of the contacts in the user's various circles that would be able to view a post by the user.

As discussed above, one advantage of contact groups is that the user can create and organize the group. Thus, the user creates the group and adds/modifies the members of the group. This allows the user to maintain complete control over of the contact groups. However, the user-involved creation aspect can also be a drawback. Because the user has to manually input and add every member of the group, the task can become very tedious and inefficient. In addition, a user might forget to add certain members or might consider it to be too much of a hassle. Thus, in some embodiments, it is advantageous for a social network service to identify potential members of a contact group or social circle and suggest these potential members to the user. That way, the social network service assists in the creation and maintenance of the contact groups, thus enhancing the user experience.

FIG. 1 is a diagram of an example network architecture 100. The network architecture 100 includes a number of client devices 102 communicably connected to a server device 112 by a network 114. The server device 112 includes a processing device 116 and a data store 118. The processing device 116 executes computer instructions (e.g., social network computer program code) stored in the data store 118 to perform the functions of a social network server.

Users of the client devices 102 access the server device 112 to participate in a social networking service. In one example, the client devices 102 execute web browser applications that access the social networking service. In another example, the client devices 102-110 execute software applications that are specific to the social network (e.g., social networking "apps" running on smartphones).

In some embodiments, users interacting with the client devices 102 participate in the social networking service provided by the server device 112 by posting information, such as text comments (e.g., updates, announcements, and replies), digital photos, videos, or other appropriate electronic information. In some implementations, information is posted on a user's behalf by systems and/or services external to the social network or the server device 112. In one example, the user posts a review of a movie to a movie review website, and with proper permissions that website may cross-post the review to the social network on the user's behalf. In another example, a software application executing on a mobile device, with proper permissions, uses global positioning system (GPS) capabilities to determine the user's location and automatically update the social network with his location (e.g., "At Home", "At Work", "In Brownsdale, Minn.").

In some embodiments, users interacting with the client devices 102 use the social network provided by the server device 112 to define contact groups to organize and categorize the user's relationships to other users of the social network. Examples of the creation and use of contact groups are provided in the description of FIG. 2, and throughout the remainder of the present disclosure.

In some implementations, the client devices 102 are computing devices such as laptop or desktop computers, smartphones, personal digital assistants, portable media players, tablet computers, or other appropriate computing devices that can be used to communicate with an electronic social network. In some implementations, the server device 112 is a single computing device such as a computer server. In some implementations, the server device 112 represents more than one computing device working together to perform the actions of a server computer (e.g., cloud computing). In some implementations, the network 114 is a public communication network (e.g., the Internet, cellular data network, dialup modems over a telephone network) or a private communications network (e.g., private LAN, leased lines).

Figure 2:
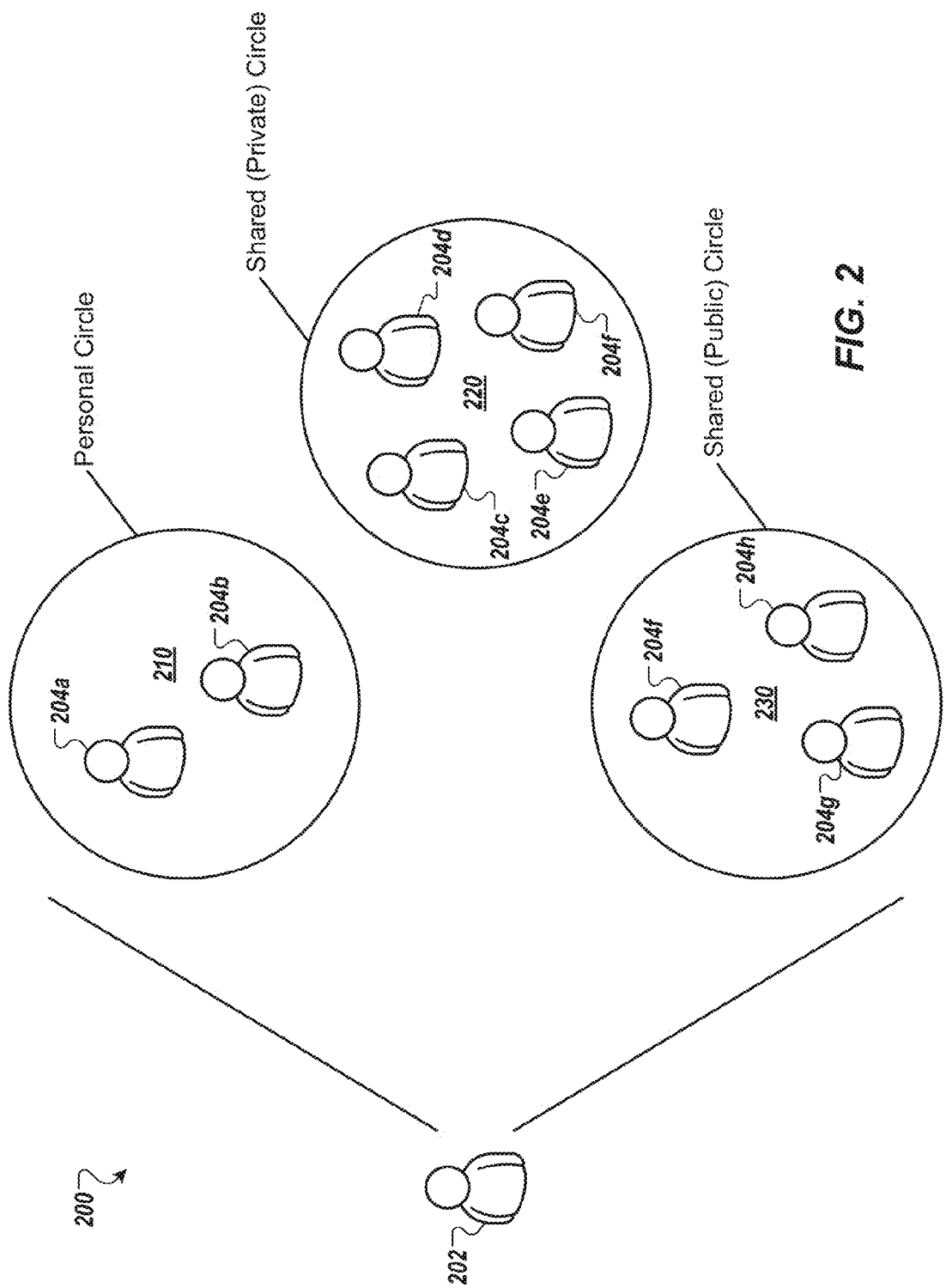
FIG. 2 is a diagram of an example social network including contact groups.

FIG. 2 is a diagram of an example social network 200 including contact groups. A user 202 is a member of a social network that supports the creation and use of contact groups (e.g., the social network provided by the server device 112 of FIG. 1). In the present example, the user 202 has a number of contacts 204a-204h with which the user 202 can have some form of relationship (e.g., friends, coworkers, customers, teammates, clients, relatives, club members, classmates). The user 202 categorizes the contacts 204a-204h by assigning them to one or more contact groups, such as a contact group 210, a contact group 220, and a contact group 230.

The contact group 210 is a personal circle. In some implementations, personal circles are groupings created by and may be known only to the user 202 (e.g., the contacts 204a, 204b may receive no indication that they are in the user's 202 private contact group 210). In some implementations, personal circles are groupings created by the user 202 and may be known to the user 202 as well as the contacts (e.g., contacts 204a, 204b) that are members of the contact group (e.g., the contacts 204a, 204b receive an indication that they have been added to the private contact group 210).

In some implementations, private circles are used to organize and categorize the contacts 204a-204h in ways that are relevant to the user 202. In some implementations, the user 202 uses personal circles to organize contacts in order to discretely target which of his contacts 204a-204h will see certain postings or have access to particular information. For example, the user 202 may be politically active and tend to post items that would be appreciated by some contacts and vigorously opposed by others. As such, the user can organize his contacts into "Left Political Philosophy Friends" and "Right Political Philosophy Friends" personal circles. By doing so, the user 202 may better target selected postings to the people who would be most appreciative of such information, or conversely, may prevent contacts 204a-204h who may be offended by such information.

The contact group 220 is a shared private circle, which may also be referred to simply as a shared circle. In general, shared private circles are contact groups that the user 202 creates and invites, rather than assigns, contacts to voluntarily join. Contacts that accept the invitation become members of the shared private circle. Members of a shared private circle can see information posted to that circle by the user 202 and can post information to be shared with other members of the shared private circle. In one example, the user 202 tends to post a large number of jokes to the social network. However, while some of the contacts 204a-204h find the jokes to be entertaining, others simply find them to be simply annoying. Realizing this, the user 202 creates a "jokes" shared private circle and invites some or all of the contacts 204a-204h to join. With the "jokes" contact group in place, the user 202 posts witticisms to the "jokes" circle, and only those contacts who have accepted the invitation are able to see the user's 202 wit. Similarly, members of the shared private circle are able to post messages to the circle, and those posts are visible to other members of that circle.

The contact group 230 is a shared public circle. In general, shared public circles are contact groups that the user 202 creates, and invites, rather than assigns, contacts to voluntarily join. Further, the existence of a shared public circle is publicly available such that other users of the social networking service (e.g., not necessarily just the user's 202 contacts 204a-204h) may request to join the public contact group. Members of shared public circles post information to, and see updates posted by, other members of the same public shared circle. In some implementations, public shares circles are "fan" or "group" circles (e.g., circles dedicated to a particular place, event, product, movie, celebrity, sports team, company, concept, philosophy, organization, support network). For example, the user 202 may create a shared public circle for his band, and fans of his act may join the circle to discuss upcoming shows, download MP3s of the band's music, or post videos from recent concerts. In another example, the user 202 creates a shared public circle for alumni of his high school graduating class, which his former classmates may find and join in order to stay in touch with one another and post pictures from their school days. Once a shared public circle is created, in some implementations the user 202 can invite people to join the circle. In some implementations, nonmembers of the circle can request membership in the shared public circle, and membership in a shared public circle is automatic upon request, or requires the user's 202 approval to become a member of the shared public circle.

In some implementations, one or more default contact groups are provided or suggested to a user when the user subscribes to a social networking service. In one example, "Friends," "Family," and "Coworkers" contact groups are automatically provided in a user's profile upon the user subscribing to the particular social networking service. Other contact groups can automatically be provided including, for example, an "Acquaintances" contact group and/or a "Just Following" contact group. In some implementations, the automatically created or suggested contact groups include personal contact groups. Although default contact groups can be automatically provided, it may be left to the user to actually populate the default contact groups with contacts. In one example, each of the default contact groups is initially empty of contacts, and the user populates each of the default contact groups as discussed in further detail herein.

In some implementations, one or more default contact groups is automatically generated based on the user's profile information. In one example, the user's profile includes demographic data (e.g., age), job data and/or interests data (e.g., sports, hobbies). Through data mining techniques (e.g., clustering contact group creations over a threshold number of users), a provider of the social networking service determines that users within a particular demographic typically create one or more particular types of contact groups. By categorizing a user within a particular demographic, the provider of the social networking service can suggest or automatically generate one or more particular default contact groups. For example, if a particular user falls within a demographic that corresponds to a high school student, a default "School Friends" contact group is suggested to or automatically created for the user. As another example, if a particular user falls within a demographic that corresponds to a college student, a default "College Friends" contact group is suggested to or automatically created for the user. Contact groups can also be suggested or created based on interest data provided in a user's profile. For example, if a particular user's interests include skiing, a default "Ski Buddies" contact group may be suggested to or automatically created for the user.

As discussed herein, in some implementations, posts are distributed to contacts within the social network including one or more contact groups, such that they are exclusively viewable by the indicated contacts and/or contacts within one or more indicated contact groups. In one example, and as discussed in further detail below with regard to FIGS. 11A and 11B, a user of the social networking service generates a post and indicates one or more contact groups for distribution of the post. In some implementations, an autocomplete component enables the user to type in part of the name of a contact group and/or individual contact to specify which contact groups and/or individual contacts require delivery of the post content. During a post write-time, a post data set is transmitted from the user's client computing device (e.g., client device 102 of FIG. 1) to a distribution hub, which can be provided at a server (e.g., server device 112 of FIG. 1). The post data set includes a plurality of data. In some implementations, the post data set includes post content data (e.g., text, uniform resource indicator (URI)), timestamp data (e.g., a timestamp indicating the time that the post was generated), distribution data (e.g., contacts and/or one or more contact groups), and identification (ID) data (e.g., an ID assigned to the post data set upon generation of the post). In some implementations, the distribution data is processed to provide an access control list (ACL) that specifies which contacts within the social networking system are granted access to the post content. In some implementations, the distribution hub determines end points the post data set is to be distributed to based on the ACL. More specifically, the set of contacts that care about the post and/or that are allowed access to the post is determined based on the ACL and the ID of the post is written to a per user/view index at the distribution hub. When fetching posts to distribute to a user, the user/view index is accessed and the IDs of the various posts that the user is allowed to view are determined. The post data sets are retrieved from a data store (e.g., data store 118 of FIG. 1) and are transmitted to a client device associated with the requesting user.

FIGS. 3A-3H depict screen-shots 300 of an example graphical user interface for creating and maintaining contact groups. In the screen-shots 300, a social graph editor user interface (UI) 301 is shown. In some implementations, the UI 301 can be the interface presented by a purpose made social networking application, while in some implementations the UI 301 can be one or more web pages of a social networking website displayed in a general purpose web browser.

The UI 301 includes a number of choices presented in a menu bar 305. In the present example, the "Social Network" choice has been selected by a user. This selection causes a web-based social networking application to be executed and a social network menu 310 to be displayed. The social network menu 310 includes a profile indicator 312 in which information such as a user name 314 and a user image 316 associated with the currently logged in user are displayed.

The social network menu 310 also displays, among other items, a circles submenu 318. The circles submenu 318, when selected (e.g., as represented by the highlighting of the submenu's title), causes a contact group display 320 to be presented. The contact group display 320 includes a number of circles 322 that are visual representations of various contact groups that the user has created or has permission to edit. Each of the circles 322 displays information about the contact group it represents. For example, the circle 322c displays a name 324a, a count 324b of the number of contacts associated with the contact group, and an indication of what kind of circle (e.g., personal, private shared, public shared) that the circle 322c is.

The contact group display 320 also includes a contact display 326. The contact display 326 provides a graphical interface for viewing, selecting, and organizing items in the user's contact lists. A collection of contact icons 328 represents the contacts or other entities (e.g., organizations, places, or other items) socially networked with the particular user. In some implementations, the icons can be digital photos of the contacts they represent (e.g., the icons 328a, 328d), arbitrary images (e.g., the icons 328b, 328g), or placeholders (e.g., when the contact has no image associated with their account, such as the icon 328c). Contacts who are members of one or more of the user's contact groups are identified by an indicator 330 superimposed upon the icons (e.g., the icons 328a, 328f, 328h). A scroll bar 329 is provided for the user to access additional contact icons that may not fit into the initial view.

A collection of filter buttons 332 is provided to select subsets of the user's contacts. The "all people" filter button 332a, when selected, causes the contact display 326 to display the user's contacts with substantially no filtering. The "selected" filter button 332b, when selected, causes the contact display to display only the contacts that have been selected by the user. For example, the user may select multiple contacts while in an "all people" view, and then display only his selected contacts by pressing the "selected" filter button 332b. The "in circles" filter button 332c, when selected, causes the contact display 326 to display substantially only the contacts who share at least one contact group with the user. The "no circles" filter button 332d, when selected, causes the contact display 326 to display substantially only the contacts that are not in a contact group associated with the user. A search input box 324 is provided so the user can type in all or part of a name, and the resulting matches will appear in the contact display 326.

A sorting selector 338 provides selections that the user may choose to alter the way the user's contacts are displayed in the contact display 326. For example, a "frequently contacted" selection may be chosen to sort the user's contacts according to how often the user communicates with them (e.g., by tracking numbers or lengths of contact group posts, email, instant messages, phone calls). In another example, a "number of circles" selection may be chosen to sort the user's contacts according to how many circles the contact shares with the user.

The contact group display 320 also includes a collection of contact group filter buttons 340. The "all circles" button 340a, when selected, causes the contact group display 320 to display substantially all the contact groups that the user is able to administer. The "personal" button 340b, when selected, causes the contact group display 320 to display substantially only the user's personal circles. The "shared" button 340c, when selected, causes the contact group display 320 to display substantially only the user's shared private circles. The "shared-public" button 340d, when selected, causes the contact group display 320 to display only the user's shared public circles.

A posting box 306 is also provided in the UI 301. The posting box 306 presents across multiple web-based applications, such that a user can enter and publish a post from any of the multiple web-based applications, without having to go back to the social networking application to author and publish a post. For example, and as noted above, the posting box 306 is provided in the UI 301 of the social networking application. The user, however, may switch to work in another application. For example, the user may select "Mail" from the menu bar 305, upon which selection, a web-based email application is executed. A UI of the web-based email application (not shown) will also include the posting box 306, such that the user can still post to the social networking service, even though the user is not directly working in the social networking application.

Figure 3A:
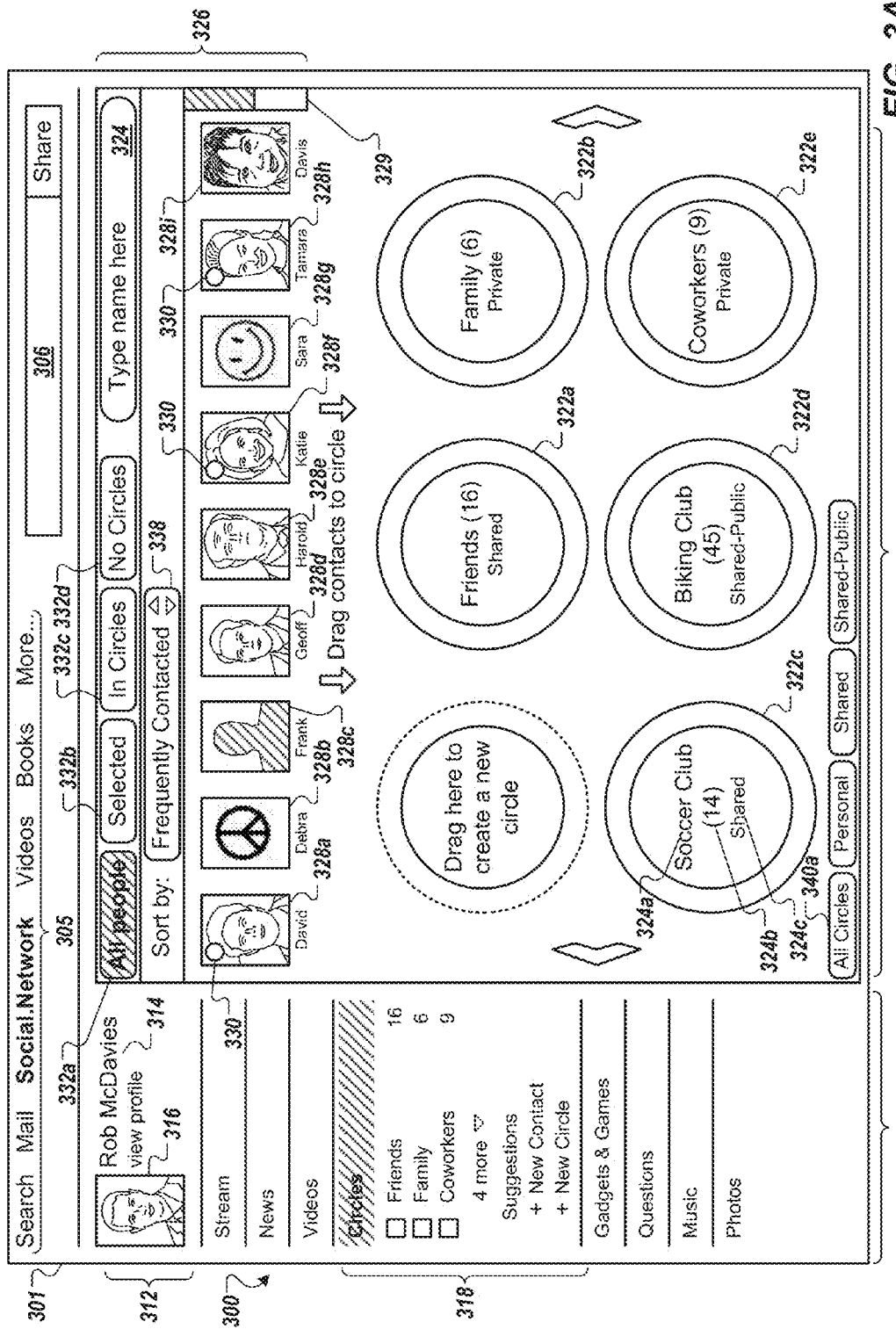
FIGS. 3A-3H depict screen-shots of an example graphical user interface for creating and maintaining contact groups.
Figure 3B:
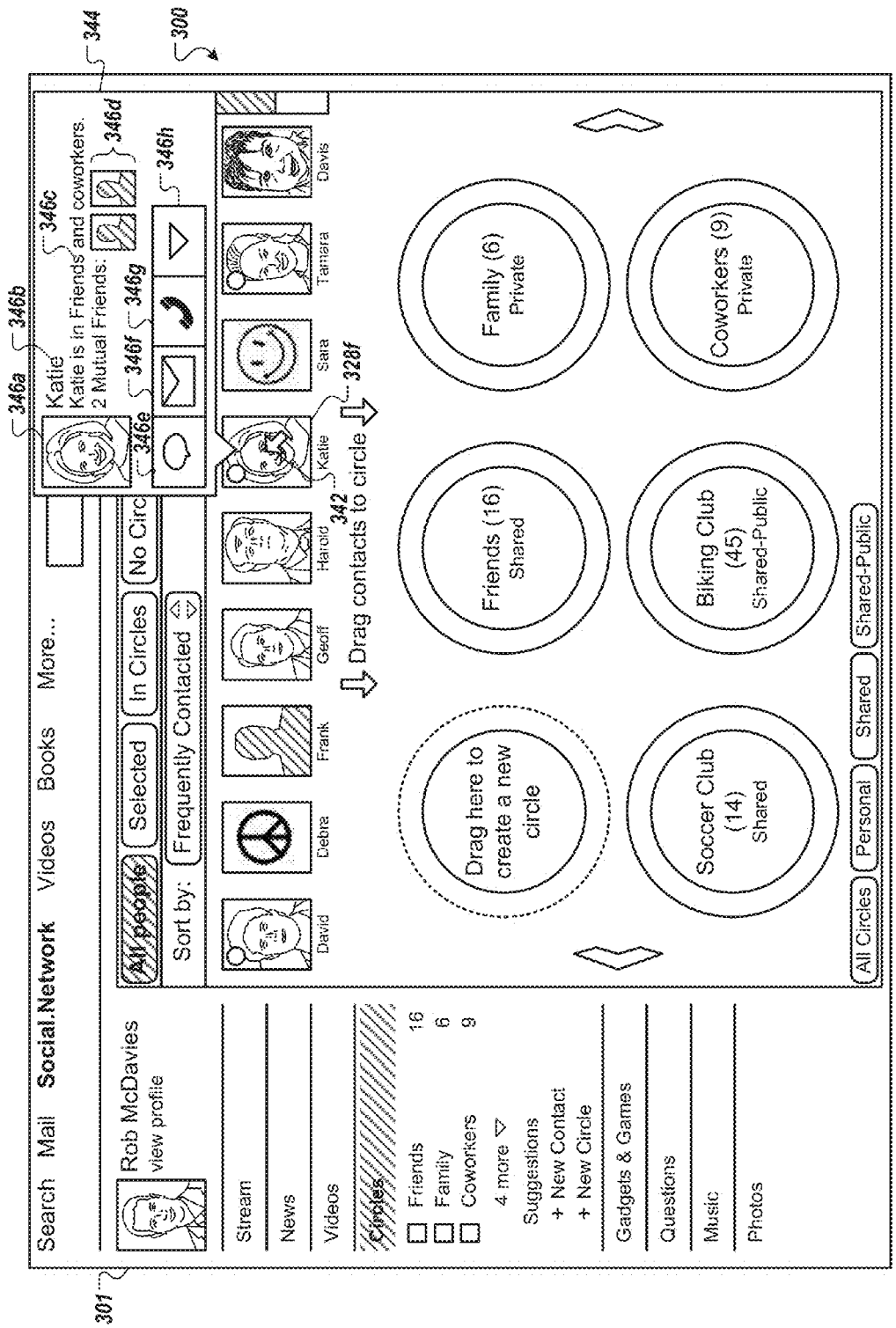

Referring now to FIG. 3B, the UI 301 is shown wherein the user is "hovering" (e.g., pausing or clicking) a pointer 342 over the contact icon 328f. In response to the hovering, a contact dialog 344 is presented. In general, the contact dialog 344 displays details about, and ways to interact with, a selected contact. The contact dialog 344 includes a contact image 346a and a contact name 346b.

A circle summary 346c displays a summary of which of the user's circles the contact is in. In the illustrated example, the circle summary 346c indicates that "Katie is in Friends and Coworkers." In some implementations, the circle summary provides other information. In one example, contacts that are in a larger number of the user's circles are displayed with a circle summary 436c such as "Katie is in eight of your circles." A mutual friends display 346d is provided to display a count of the number of people who are included in both the user's and the selected contact's friend or contact lists as well as a display of some or all of the contact images associated with the mutual friends.

A chat button 346e, when selected, initiates a chat (e.g., instant messenger) session with the selected contact. An email button 346f, when selected, initiates an email message addressed to the selected contact. A phone button 346g, when selected, initiates a telephone or other form of voice chat with the selected contact. A "more" button 346h, when selected, causes additional selections for interacting with the selected contact to be displayed. For example, the additional selections can include buttons that map or provide navigation directions to the selected client's location, and buttons that provide the user with functions or edit or delete the selected contact's information.

Figure 3C:
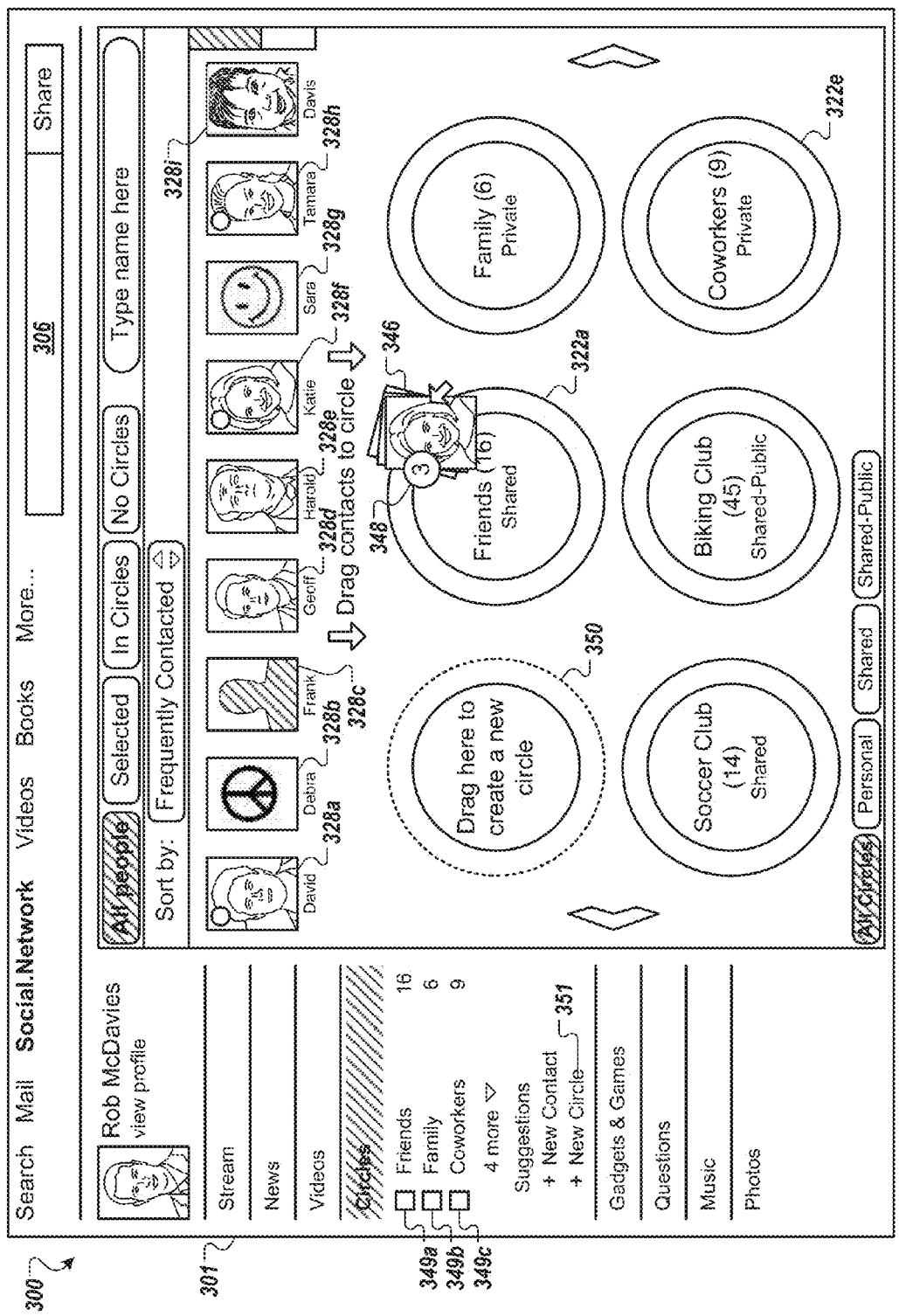

Referring now to FIG. 3C, the UI 301 is shown wherein the user is adding a collection of selected contacts to the "friends" circle 322a. In some implementations, the user can select one or more contact icons 328a-328i by clicking, so-called shift clicking, lassoing, rubber-banding, or by performing other actions within the UI 301 to select one or more of the contact icons 328a-328i. The user then "drags" the selected contacts to a target contact group, which in this example is the "friends" contact group 322a.

The selected contacts are represented by a selected contacts indicator 346. The selected contacts indicator 346 appears as a stack of the selected contacts' contact icons 328a-328i. For example, the selected contacts include the contact "Katie," and her contact icon 328f appears in the stack of the contacts indicator 346. A count indicator 348 is superimposed onto the contacts indicator 346 to display the number of contacts in the selected group.

In some embodiments, the selected contacts indicator 346 is configured to be "dragged" (e.g., moved) and "dropped" (e.g., released) onto a contact group to add the selected contacts to the selected contact group. In the illustrated example, the user appears to be dragging the selected contacts to make them members of the "friends" shared private circle 322*a*.

The user is also able to add contacts to a circle by selecting one or more of the contact icons 328, and then selecting one or more of a collection of circle selectors 349. For example, the user can click the contact icon 328*a* and then click the "coworkers" circle selector 349*c* to add "David" to the "coworkers" contact group 322*e*.

The selected contacts indicator 346 can also be dragged and dropped onto a new circle region 350. By dropping the selected contacts indicator 346 onto the new circle region 350, a process for creating a new contact group of which the selected contacts will become members is initiated. The user is also able to create a new circle by clicking the "new circle" selector 351. The creation of new contact groups will be discussed in additional detail with reference to FIGS. 4A-4C and 5A-5D.

In some implementations, the user drags the selected contacts indicator to an open space outside of the contact groups 322 or the new circle region 350. In one example, the user selects a number of contacts for addition to a circle, but then changes his mind and wishes to cancel the action. In some implementations, the user drops the selected contacts indicator 346 onto an open space to cancel the action. In some implementations, a visual indication accompanies the cancellation action. In one example, when the user drops the selected contacts indicator 346 in empty space, the stack of contact icons within the selected contacts indicator 346 is animated to give the appearance that each contact icon in the stack is "flying" back to its corresponding contact icon 328*a*-328*i*.

Figure 3D:
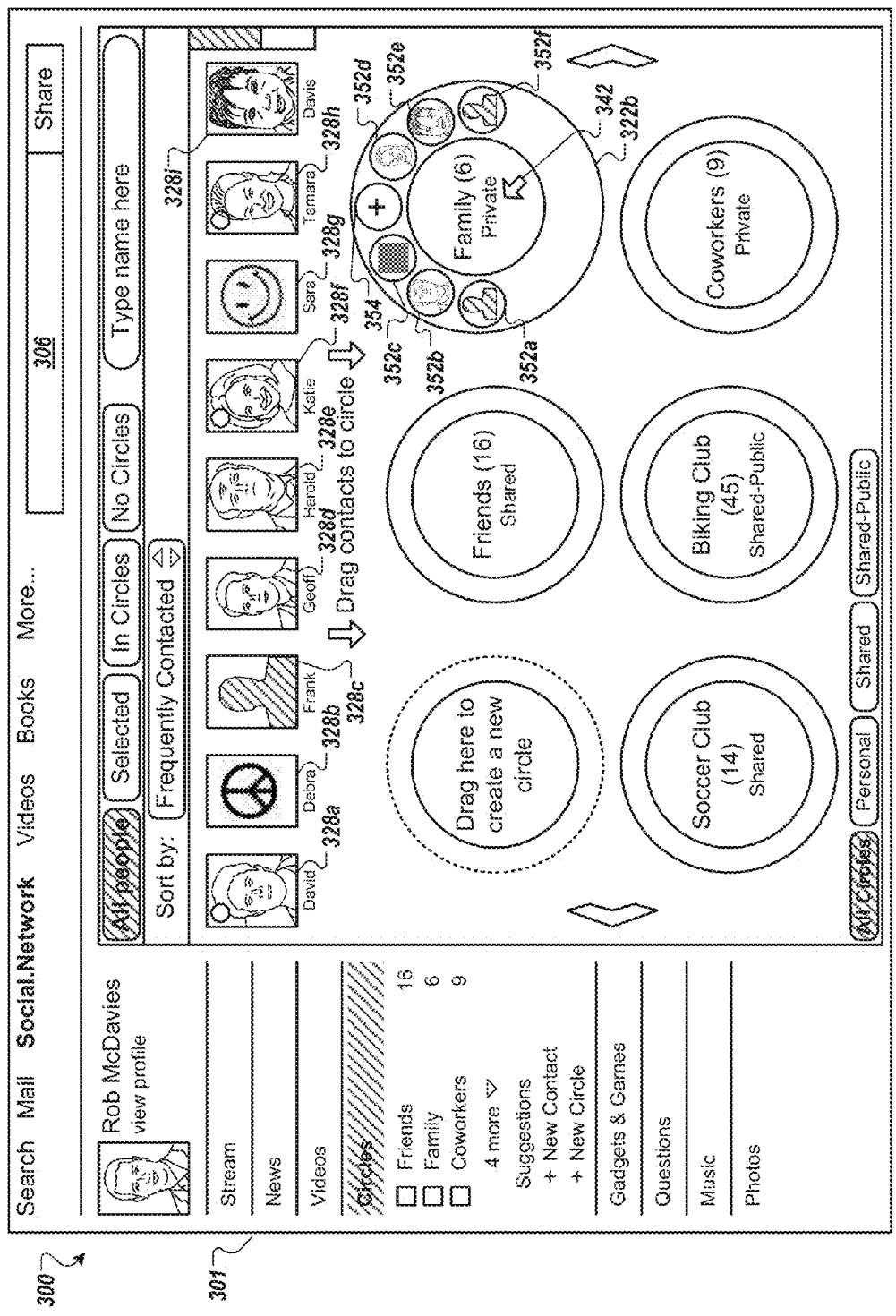

Referring now to FIG. 3D, the UI 301 is shown in which the user is hovering the pointer 342 over the "family" contact group 322*b*. In general, the user may hover the pointer 342 over one of the contact groups 322, and in response the selected contact group alters its appearance to indicate some or all of the contacts who are members of the selected contact group.

In the present example, the user is hovering the pointer 342 over the "family" contact group 322*b*. In response, the appearance of the contact group 322*b* is modified to display a number of member icons 352 to provide a visual representation of the contact icons (e.g., contact icons 328*e*, 328*g*, 328*h*, 352*e*) for contacts included in the contact group 322*b*. The modified contact group 322*b* also includes an add icon 354. The add icon, when selected, initiates a process for adding more contacts to the associated contact group 322*b*. For example, clicking the icon 354 can cause a dialog box or other user interface to appear, with which the user can interact to add contacts to the contact group 322*b*.

Figure 3E:
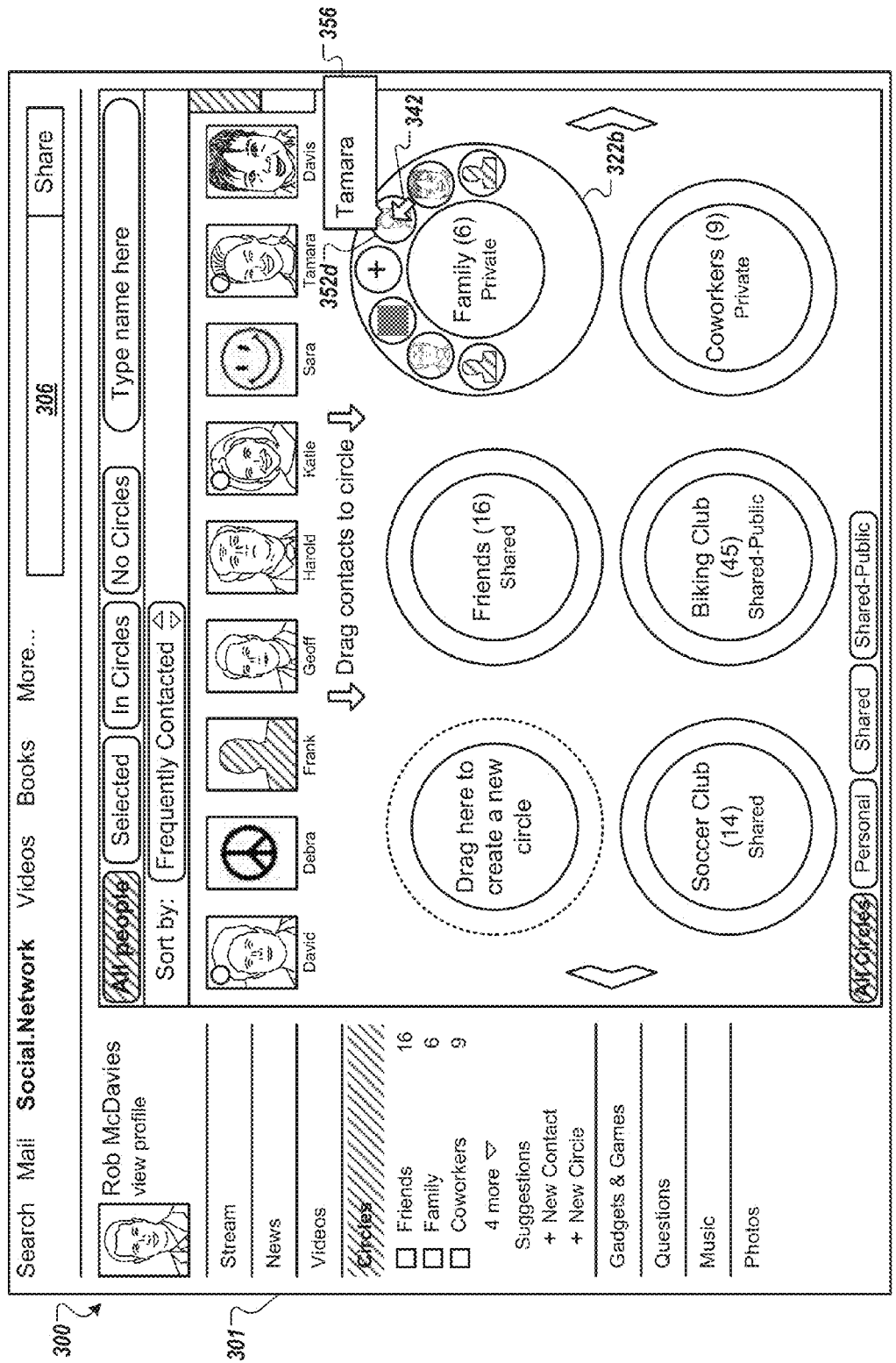

Referring now to FIG. 3E, the UI 301 is shown in which the user is hovering the pointer 342 over the member icon 352*d* of the contact group 322*b*. In response, a member dialog 356 is presented to display information about the selected member of the contact group. In the present example, the dialog 356 displays the name of the selected member (e.g., "Tamara").

Figure 3F:
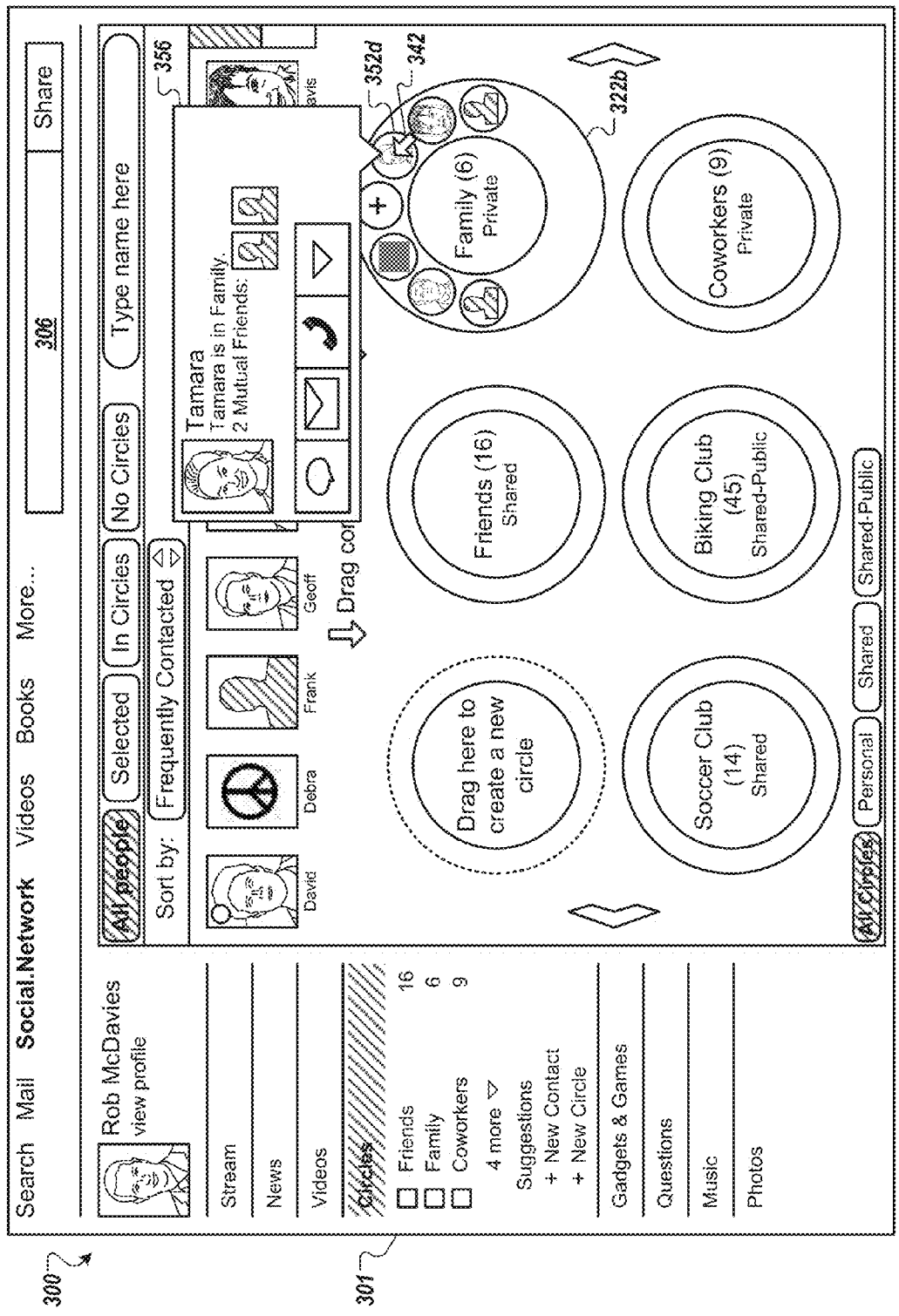

Referring now to FIG. 3F, the UI 301 is shown in which a member dialog 356 is displayed to provide information about, and tools to interact with, the member represented by the member icon 352*d*. In some implementations, the member dialog 356 is substantially similar in appearance and function to the contact dialog 344 described previously. In some implementations, the member dialog 356 is presented in response to the user clicking or otherwise selecting the member icon 352*d*. In some implementations, the member dialog 356 is presented in response to an extended hover operation. For example, the user may hover the pointer 342 over the member icon 352*d* and in response the dialog 356 of FIG. 3E may be initially presented. In examples where the user continues to hover the pointer 342 over the member icon 352*d*, the dialog 356 is replaced by the member dialog 356.

Figure 3G:
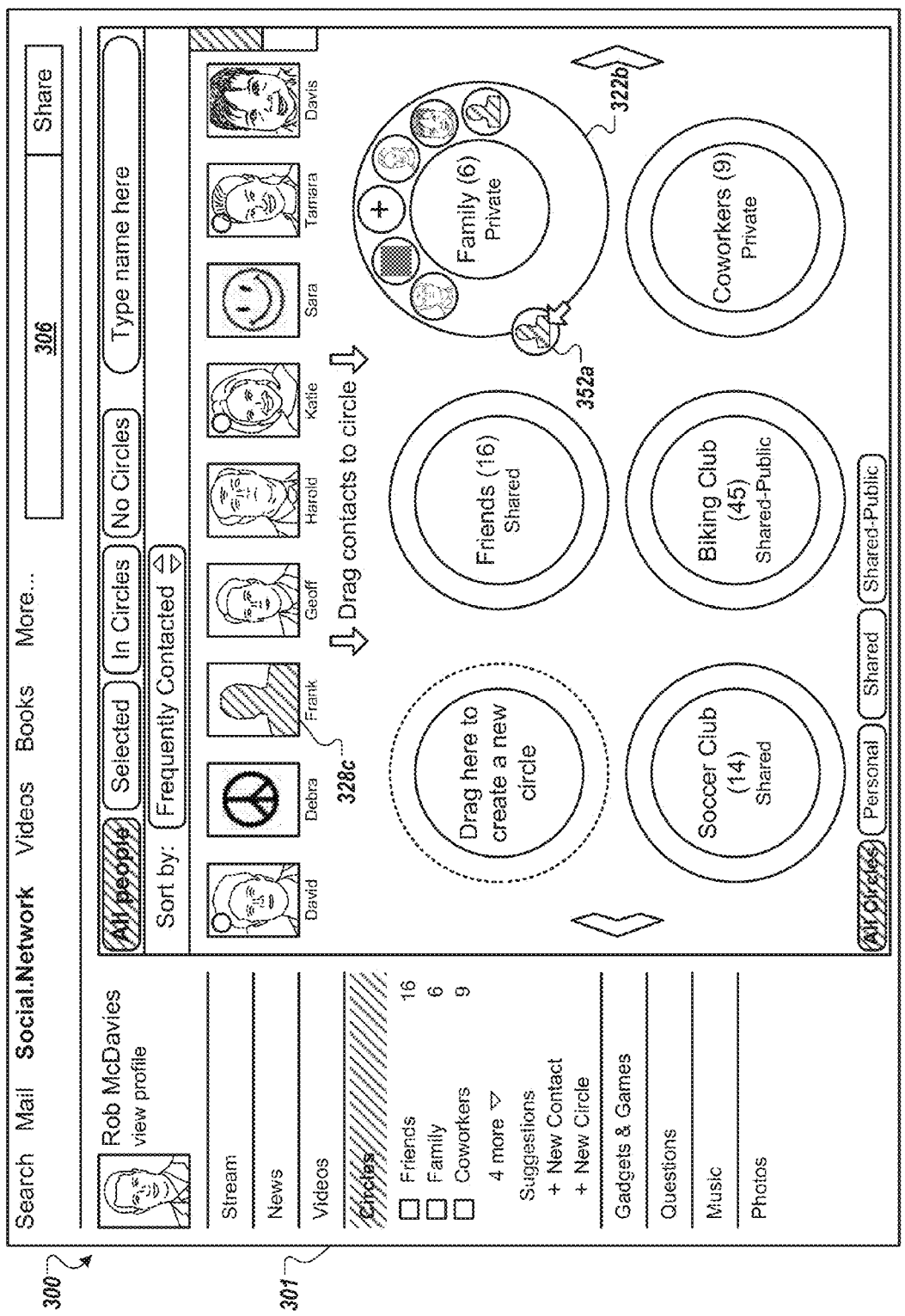

Referring now to FIG. 3G, the UI 301 is shown in which the user is dragging the member icon 352*a* out of the contact group 322*b*. In general, the user can drag member icons out of contact groups to end the selected contacts' memberships in the selected contact groups. In the illustrated example, the member icon 352*a* is being dragged out of the contact group 322*b*. The user may then drop the member icon 352*a* onto another contact group to move the selected contact to that contact group, or the user may drop the member icon 352*a* into an empty space on the screen. In some implementations, when dropped onto empty space the member icon 352*a* is animated to give the appearance that the member icon 352*a* is flying back to its corresponding contact icon 328*c*.

Figure 3H:
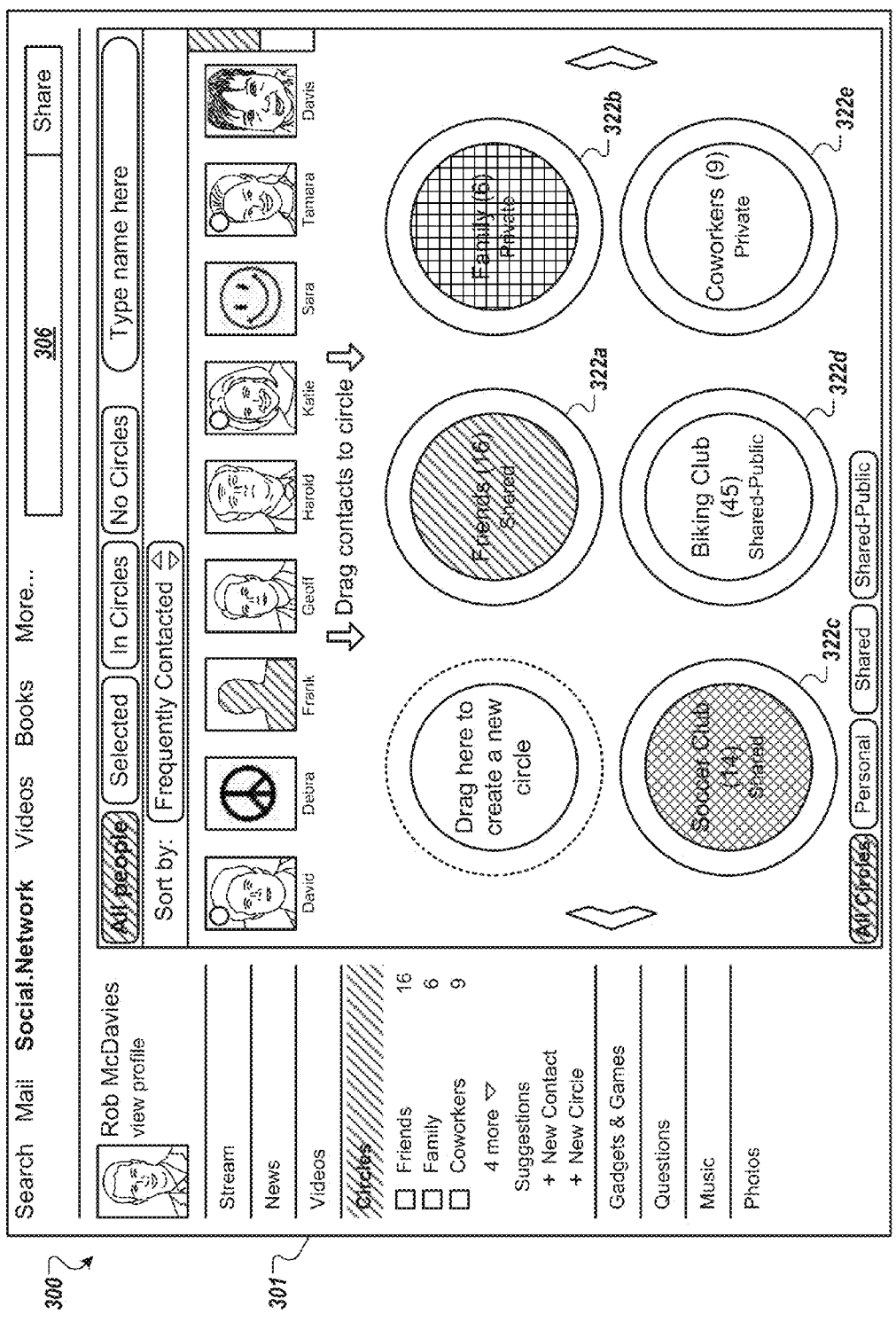

Referring now to FIG. 3H, the UI 301 is shown in which some of the contact groups 322 are shown with modified appearances. In some implementations, the user can customize the appearance of the contact groups 322 with selected foreground and background colors and/or fill patterns, alternate fonts, animations, videos, or images. In illustrative examples, the contact group 322*a* has a custom blue background, the contact group 322*b* displays a digital photo as a background, and the contact group 322*c* has a black and white crosshatch pattern. In this manner, a visual indicator is provided such that the user can rapidly identify and distinguish between the various contact groups. In some implementations, the appearance of the contact groups 322 is altered automatically. For example, contact groups with a great deal of activity are displayed with brighter colors than contact groups that are experiencing less traffic. In another example, the contact groups 322*a*-322*e* automatically display member icons or recently posted digital photos as their backgrounds.

In some implementations, the pattern, color or background image of the contact group is automatically generated based on the type of contact group. In one example, a personal contact group includes a first color (e.g., red), a shared private contact group includes a second color (e.g., green) and a shared public contact group includes a third color (e.g., blue). In this manner, the user is provided with a graphical distinction between types of contact groups to enable quick recognition of the types of contact groups.

Figure 4A:
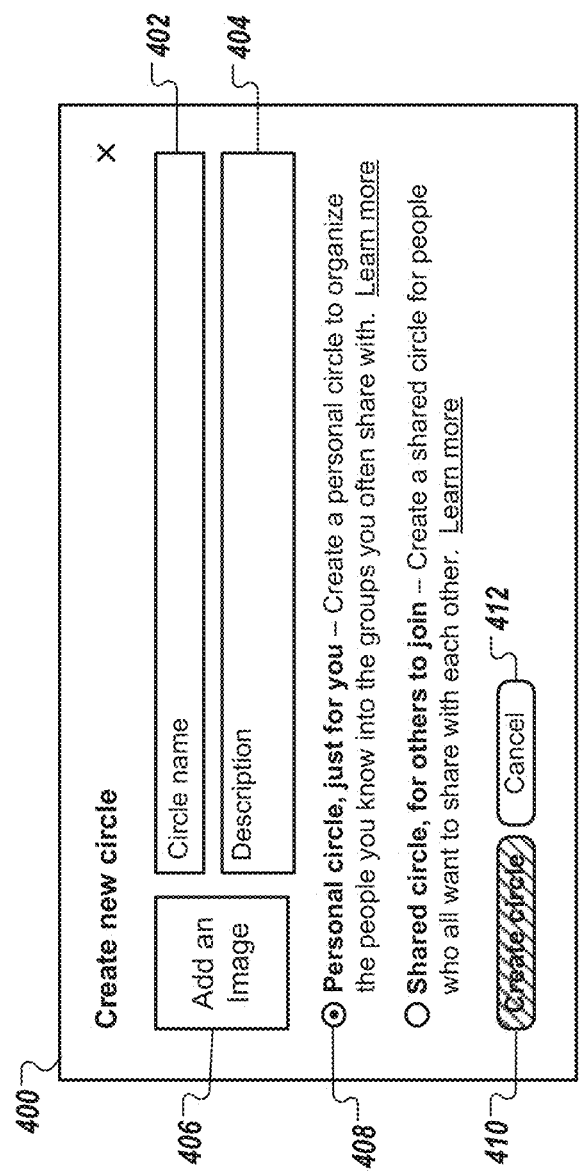
FIG. 4A depicts a screen-shot of an example dialog box for creating a personal contact group.

FIG. 4A depicts a screen-shot of an example dialog box 400 for creating a personal contact group. In some implementations, the dialog box 400 is presented in response to the user dragging one or more contacts onto the new circle region 350, or clicks the "new circle" selector 351 of FIG. 3C. The dialog box 400 includes a name input box 402 and a description input box 404, in which the user can enter a name and description, respectively, for the new contact group. An icon selector 406, when activated, provides the user with an interface to select an image to represent the contact group.

A selector 408 is provided for the user to select to indicate that the user wishes the new circle to be created as a personal circle. In general, a personal circle is used by and known only to the user, and may be used to categorize the user's contacts without the contacts necessarily knowing which personal circles they have been placed in. A "create circle" button 410, when activated, causes a new contact group to be created according to the information and selections chosen by the user. A cancel button 412, when activated, cancels the creation of a new contact group.

Figure 4B:
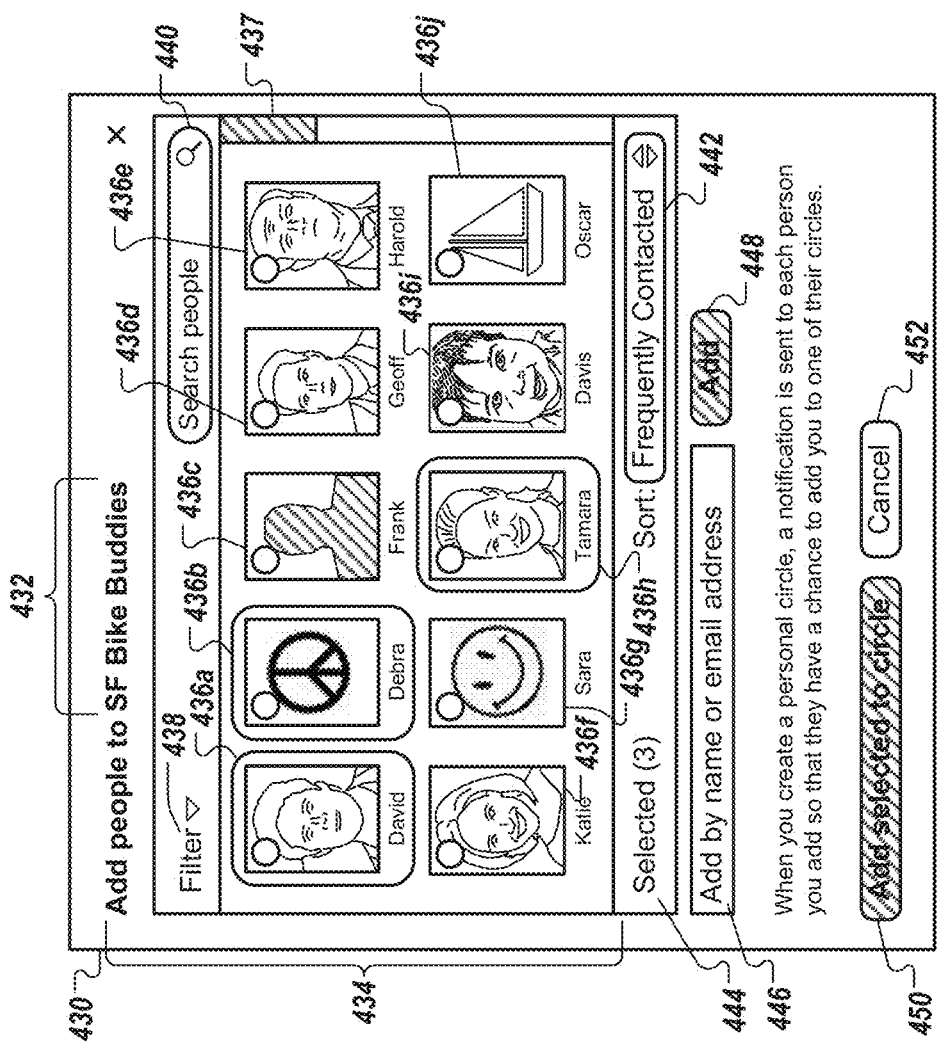
FIG. 4B depicts a screen-shot of an example dialog box for adding contacts to a personal contact group.

FIG. 4B depicts a screen-shot of an example dialog box 430 for adding contacts to a personal contact group. In some implementations, the dialog box 430 is presented when the button 412 of FIG. 4A is clicked. The dialog box 430 displays a banner 432. In some implementations, the banner 432 includes the name of the new contact group as provided by the user in the name input box 402.

The dialog box 430 includes a contact selector 434 which displays a collection of contact icons 436. A scroll bar 437 is provided so the user is able to view additional contact icons that may not fit into the initial view. In the present example, the user has selected the contact icons 436*a*, 436*b*, and 436*h*. The contact selector 434 also includes a filter selector 438, a search input box 440, and a sorting selector 442. The filter selector 438, when selected, provides the user with options for filtering which of the user's contacts will appear as contact icons in the contact selector 434. For example, the user may wish to see only the contacts that do not currently belong to a contact group, or only the contacts that live in the same geographical region as the user. In some implementations, the search input box 440 is provided for the user to enter some or all of a contact's name, location, or other search term keyword that can be used to search a collection of contacts, and the contacts who best match the search term can appear in the contact selector 434. In some implementations, the sorting selector 442 is substantially similar to the sorting selector 338 of FIG. 3A.

A count indicator 444 displays the number of contacts that are currently selected. In some implementations, the user can select contacts for inclusion in the new contact group by clicking on selected ones of the contact icons 436*a*-436*j*. In some implementations, one or more contacts may already be selected when the dialog 430 appears. Referring back to FIG. 3C, the user may have initiated the creation of a new contact group by dragging the selected contacts indicator 346 to the new circle region 350 or by clicking the "new circle" selector 351, and as such the dialog box 430 may appear with the contacts represented by the selected contacts indicator 436 already selected.

Referring again to FIG. 4B, the dialog box 430 also includes a contact input box 446. In some implementations, the user uses the contact input box 446 to type in information (e.g., name, email address, user ID) of a person who may not be a contact of the user. In response to activation of an add button 448, the information entered into the contact input box 446 to search for and select a person who is not currently a contact of the user to the newly created contact group. An "add to selected circle" button 450, when selected, adds the selected contacts to the newly created contact group. A cancel button 452 is provided to allow the user to cancel the addition of the selected contacts to the newly created contact group.

Figure 4C:
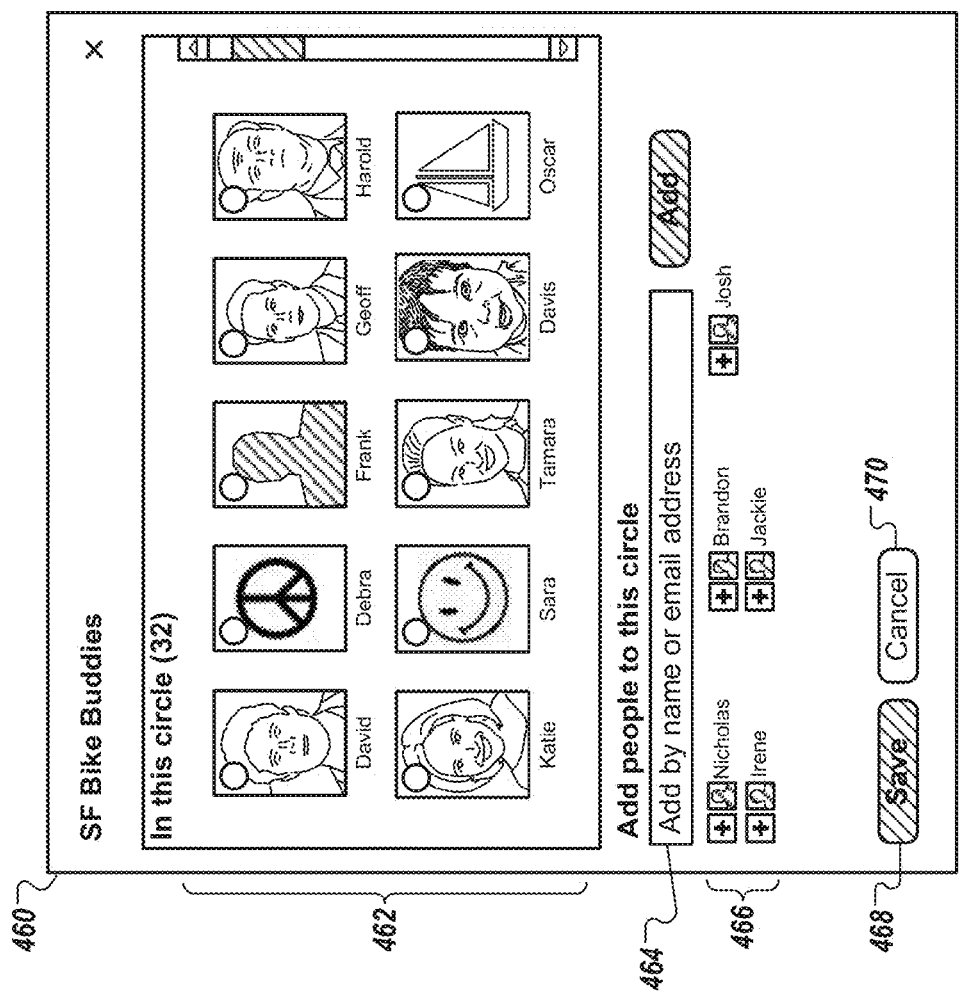
FIG. 4C depicts a screen-shot of an example dialog box for managing contacts in a personal contact group.

FIG. 4C depicts a screen-shot of an example view/edit dialog box 460 of an example contact group. In general, the view/edit dialog box 460 provides an interface that the user may interact with to view, add, remove, or otherwise alter the membership of the selected contact group. The view/edit dialog box 460 displays a collection of contact icons 462 that represent the contacts who are members of the selected contact group. A contact input box 464 is provided for the user to enter the names, email addresses, or other information that can be used to identify contacts for inclusion in the contact group.

The dialog box 460 includes a suggested contacts list 466. In some implementations, the suggested contacts list 466 displays contact icons representative of contacts who may be good candidates for inclusion in the selected contact group. For example, if the selected contact group includes a large number of contacts who are also in the user's "coworkers" circle, then additional members of the "coworkers" circle may be suggested for inclusion in the selected contact group as well. In some implementations, the user may click on items in the suggested contacts list 466 to add those contacts to the selected contact group. A save button 468, when selected, saves the current selection of contacts as members of the selected contact group. A cancel button 470, when selected, aborts any changes made by the user in the dialog box 460.

Figure 4D:
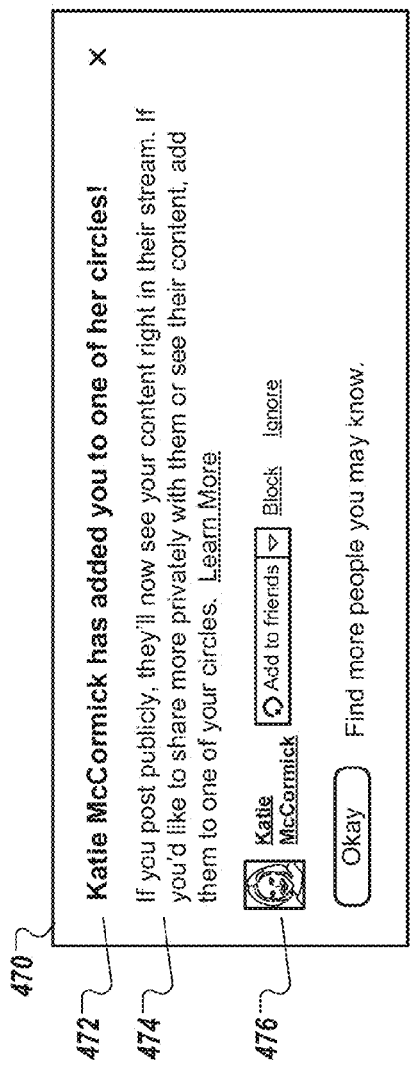
FIGS. 4D and 4E depict example screen-shots of respective alerts for notifying a user that they have been added to a contact group.
Figure 4E:
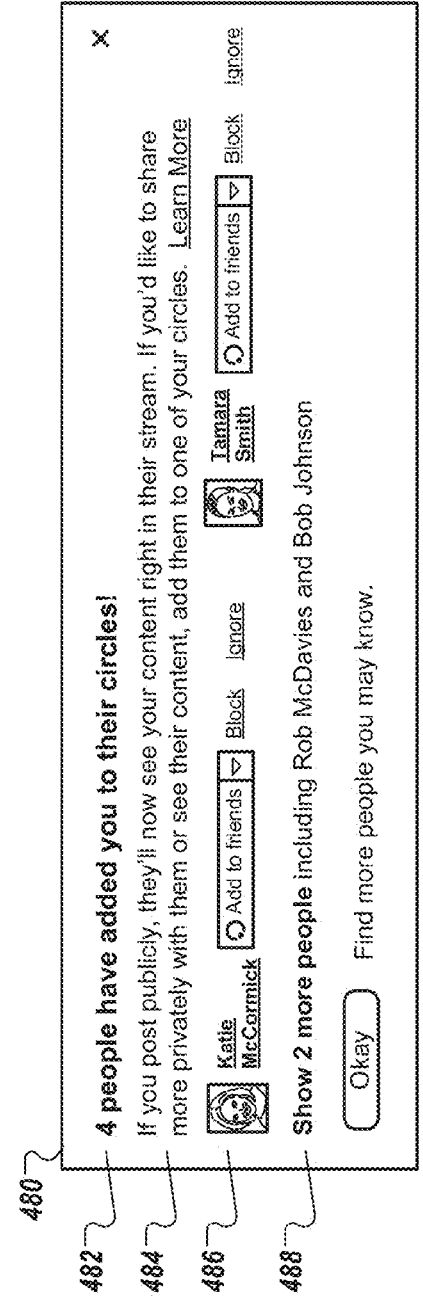

Referring now to FIGS. 4D and 4E, a user that is added to a personal contact group of one or more other users is notified. In this manner, an asymmetrical relationship between users is promoted, and users that may be unaware of contact groups and their function in the social networking service are informed. With particular reference to FIG. 4D, an example dialog box 470 is provided with an indication 472 that a particular user (e.g., Katie McCormick) has added the user to a contact group. A brief description 474 of the effect of being a member of another user's contact group is provided. Information 476 is included on the particular user (e.g., Katie McCormick) that has added the user to a contact group. Within the information 476, the user is presented with options to add the particular user (e.g., Katie McCormick) to their contacts, block the particular user and/or ignore the particular user.

With particular reference to FIG. 4E, an example dialog box 480 is provided with an indication 482 that a plurality of particular users (e.g., Katie McCormick, Tamara Smith, Rob McDavies and Bob Johnson) have added the user to respective contact groups. A brief description 484 of the effect of being a member of another user's contact group is provided. Detailed information 486 is included to provide more detailed information on the particular users (e.g., Katie McCormick and Tamara Smith) that has added the user to a contact group. An information line 488 is also provided enabling the user to expand the detailed information 486 to include detailed information on other particular users that have added the user to respective contact groups.

Figure 5A:
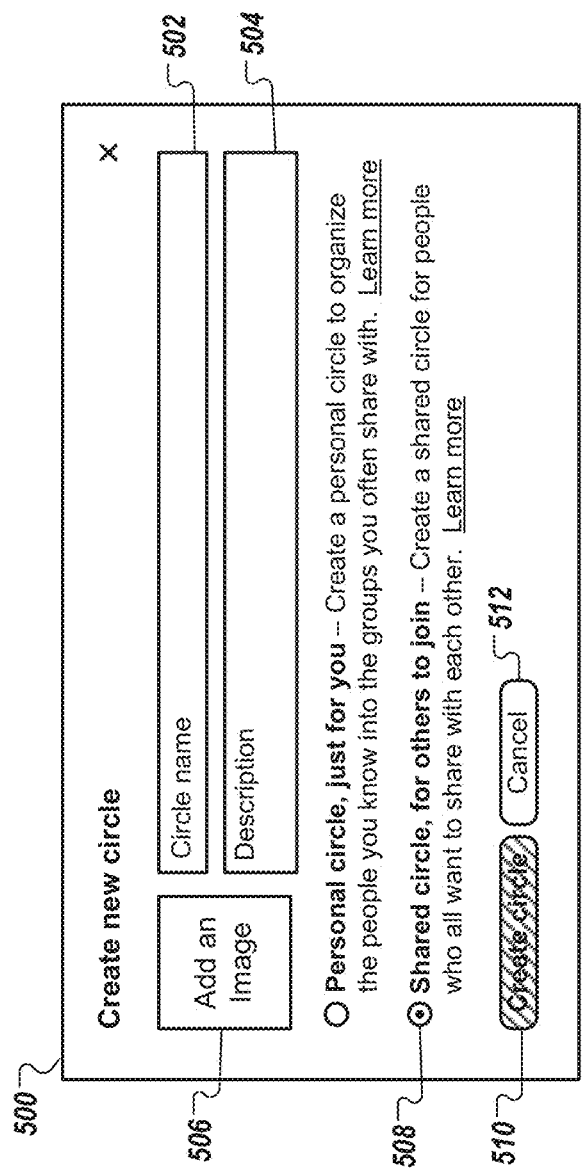
FIG. 5A depicts a screen-shot of an example dialog box for creating a shared contact group.

FIG. 5A depicts a screen-shot of an example dialog box 500 for creating a shared private contact group. In some implementations, the dialog box 500 is presented when the user drags one or more contacts onto the new circle region 350, or clicks the "new circle" selector 351 of FIG. 3C. The dialog box 500 includes a name input box 502 and a description input box 504, in which the user can enter a name and description, respectively, for the new contact group. An icon selector 506, when activated, provides the user with an interface to select an image to represent the contact group. In some implementations, the dialog box 500 can be the dialog box 400 of FIG. 4.

A selector 508 is provided for the user to select to indicate that the user wishes the new circle to be created as a shared private circle. In general, a shared private circle is created by the user, who then invites contacts to join the circle. As such, the contacts will know which shared private circles they have opted to join. A "create circle" button 510, when activated, causes a new contact group to be created according to the information and selections chosen by the user. A cancel button 512, when activated, cancels the creation of a new contact group.

Figure 5B:
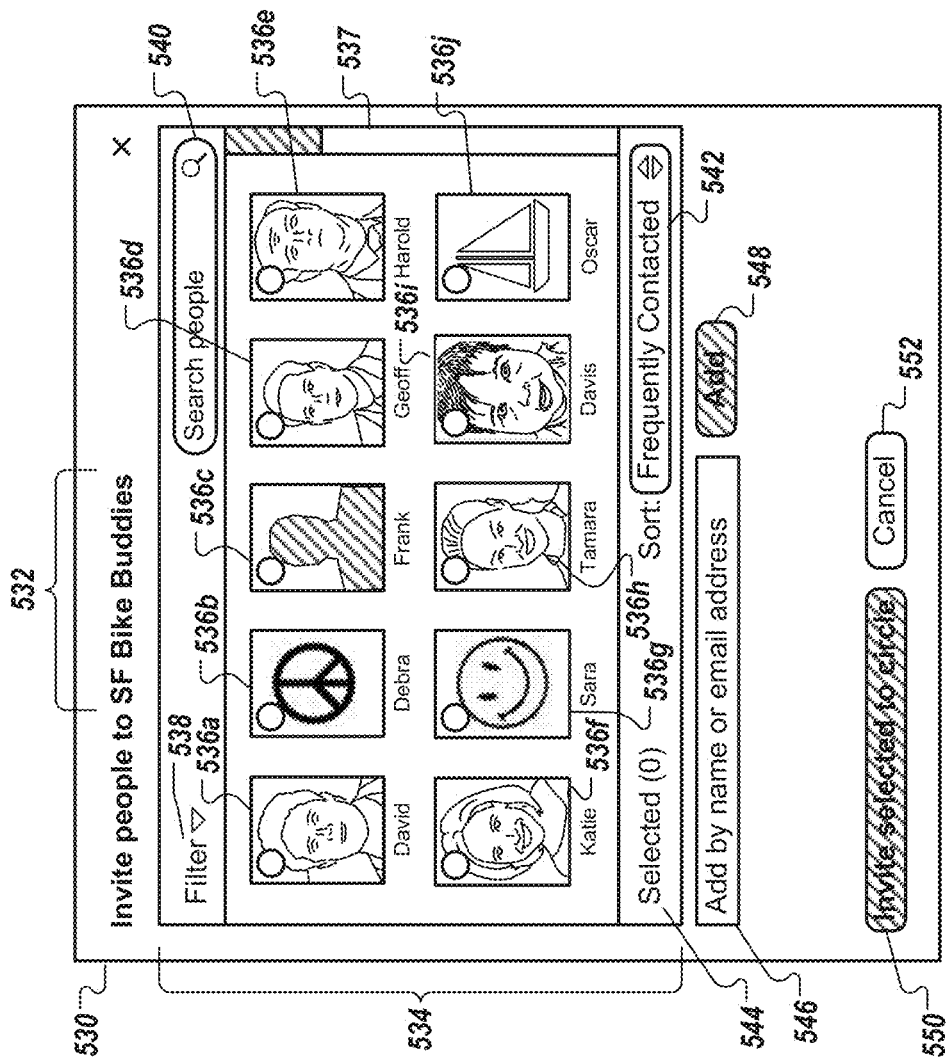
FIG. 5B depicts a screen-shot of an example dialog box for adding contacts to a shared contact group.

FIG. 5B depicts a screen-shot of an example dialog box 530 for adding contacts to a shared private contact group. In some implementations, the dialog box 530 is presented when the button 512 of FIG. 5A is clicked. The dialog box 530 displays a banner 532. In some implementations, the banner 532 includes the name of the new contact group as provided by the user in the name input box 502.

The dialog box 530 includes a contact selector 534 which displays a collection of contact icons 536. A scroll bar 537 is provided so the user is able to view additional contact icons that may not fit into the initial view. The contact selector 534 also includes a filter selector 538, a search input box 540, and a sorting selector 542. The filter selector 538, when selected, provides the user with options for filtering which of the user's contacts will appear as contact icons in the contact selector 534. For example, the user may wish to see only the contacts that are already in a contact group. In some implementations, the search input box 540 is provided for the user to enter some or all of a contact's name, location, or other search term keyword that can be used to search a collection of contacts, and the contacts who best match the search term can appear in the contact selector 534. In some implementations, the sorting selector 542 is substantially similar to the sorting selector 338 of FIG. 3A.

A count indicator 544 displays the number of contacts that are currently selected. In some implementations, the user can select contacts for inclusion in the new contact group by clicking on selected ones of the contact icons 536. In some implementations, one or more contacts are already selected when the dialog 530 appears. Referring back to FIG. 3C, the user may have initiated the creation of a new contact group by dragging the selected contacts indicator 346 to the new circle region 350 or by clicking the "new circle" selector 351, and as such the dialog box 530 may appear with the contacts represented by the selected contacts indicator 536 already selected.

Referring again to FIG. 5B, the dialog box 530 also includes a contact input box 546. In some implementations, the user uses the contact input box 546 to type in information (e.g., name, email address, user ID) of a person who may not be a contact of the user. In response to activation of an add button 548, the information entered into the contact input box 546 to search for and select a person who is not currently a contact of the user to the newly created contact group. An "add to selected circle" button 550, when selected, adds the selected contacts to the newly created contact group. A cancel button 552 is provided to allow the user to cancel the addition of the selected contacts to the newly created contact group.

Figure 5C:
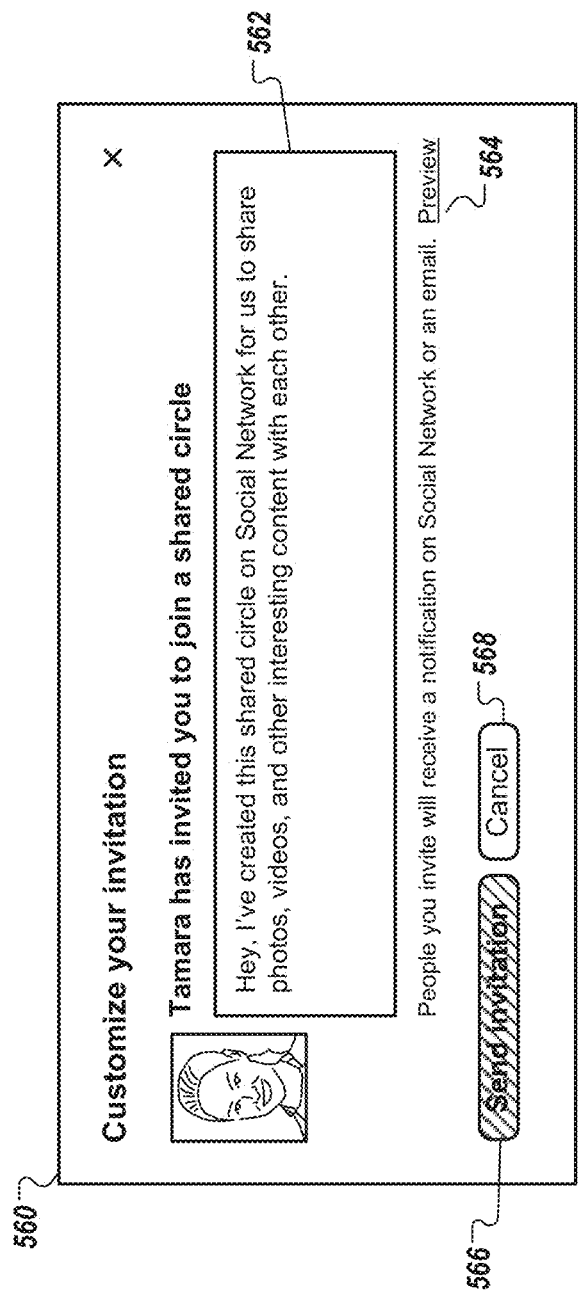
FIG. 5C depicts a screen-shot of an example dialog box for customizing an invitation to a shared contact group.

FIG. 5C depicts a screen-shot of an example invitation customization dialog box 560 of an example contact group. In general, the dialog box 560 provides the user with an interface for customizing the invitation that is sent to contacts that are being invited to join a shared private contact group.

The dialog box includes a text box 562, in which an invitation message is entered. In some implementations, the text box 562 may be pre-populated with a default message that the user then modifies when needed. A preview link 564, when selected, causes a preview of the invitation message to be shown as it would appear to an invited contact. A send button 566, when selected, causes the invitation or invitations to be sent to the selected contacts. A cancel button 568, when selected, aborts the invitation process.

Figure 5D:
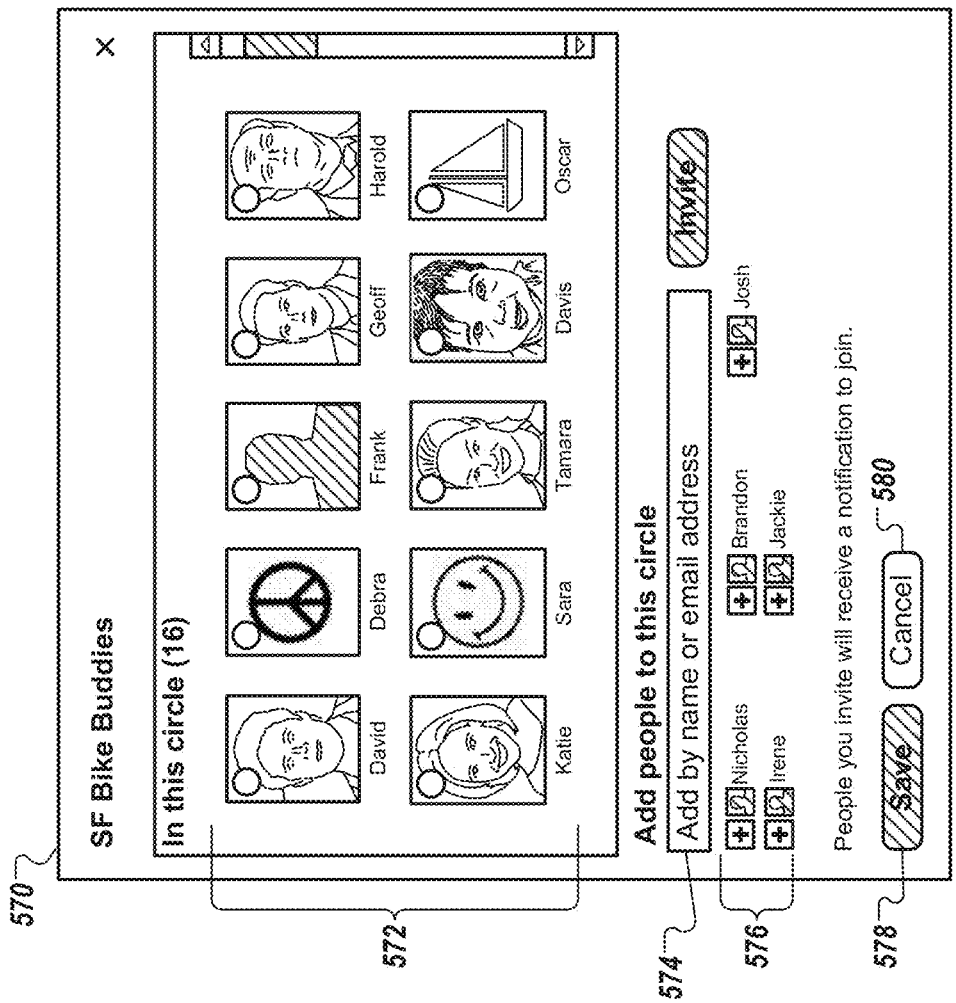
FIG. 5D depicts a screen-shot of an example dialog box for managing contacts in a shared contact group.

FIG. 5D depicts a screen-shot of an example dialog box 570 for managing contacts in a shared contact group. In general, the view/edit dialog box 570 provides an interface that the user interacts with to view, add, remove, or otherwise alter the membership of the selected contact group. In some implementations, the view/edit dialog box 570 is substantially similar in appearance and function to the view/edit dialog box 460 of FIG. 4C. The view/edit dialog box 570 displays a collection of contact icons 572 that represent the contacts who are members of the selected contact group. A contact input box 574 is provided for the user to enter the names, email addresses, or other information that can be used to identify contacts for inclusion in the contact group.

The dialog box 570 includes a suggested contacts list 576. In some implementations, the suggested contacts list 576 displays contact icons representative of contacts who are good candidates for inclusion in the selected contact group. For example, if the selected contact group includes a large number of contacts who are also in the user's "coworkers" circle, then additional members of the "coworkers" circle may be suggested for inclusion in the selected contact group as well. In some implementations, the user may click on items in the suggested contacts list 576 to add those contacts to the selected contact group. A save button 578, when selected, saves the current selection of contacts as members of the selected contact group. A cancel button 580, when selected, aborts any changes made by the user in the dialog box 570.

Figure 6A:
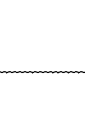
FIG. 6A depicts a screen-shot of an example stream page for a personal contact group.

FIG. 6A depicts a screen-shot of an example stream page 600 for a personal contact group. In general, the stream page 600 is displayed when the user selects one of the circle selectors 349 and a stream tab 601 to show updates, comments, and other information that members of the selected contact group have posted. In the present example, the user has selected the "family" circle selector 349*b*.

The stream page 600 includes a name block 602 that displays the name of the selected contact group, a description block 604 that displays a description of the selected contact group, an image 606 associated with the selected contact group, and a count indicator 608 that displays the total number of members of the selected contact group. An input box 610 is provided in which the user enters information that will appear to other members of the selected contact group as an update (e.g., a post) when the other members view their social networking streams. Note that in the present example, the "family" contact group is a personal circle known only to the user. In some implementations, posts made to a personal circle are visible only to contacts that the user has included in the personal contact group (e.g., the contacts do not necessarily know that they have been targeted to receive a particular update).

The stream page 600 includes a number of posts 610. The posts 610 include only the posts submitted by members of the selected contact group. The post 610*c* includes a contact icon 612 and a name banner 614 to display information about the person who made the post 610*c*. The post also includes a comment box 616 to display the contact's comments. In the example of the post 610*c*, the contact has commented on a web page, and a link section 618 is included to display at least a portion of the referenced web page. Readers of the post 610*c* can comment on the post 610*c* by selecting a comment link 620. In some implementations, clicking on the comment button can cause a comment box to be displayed, into which the user can enter comments or other information that will be displayed to other members of the contact group as a comment or reply to the post 610*c*. An example comment display 622 is shown that includes comments in response to the post 610*b*.

The post 610*c* also includes an "endorse" link 624 that, when selected, provides the user with a simple way to show an endorsement of, approval or agreement with a contact's comment or post. The user's "endorse" status is then visible to other members of the selected contact group. An example "endorse" display 626 is shown that includes a summary of the number of contacts to have shown approval of the post 610*b*.

A hide link 628, when selected, hides the associated post 610*c* and any comments, "endorses," or other information associated with the post 610*c*. In one example, the post 610*c* includes content that the user finds useless or offensive, and the user can choose to hide the post 610*c* to avoid seeing such information. In some implementations, the user is given various options for hiding information associated with the post 610*c*. In one example, the user is given options for hiding only the post 610*c*, or to hide all posts generated by a particular service on the posters behalf (e.g., awards or help requests generated by games), or to hide all posts from the contact who created the post 610*c*. An age indicator 630 displays how much time has elapsed since the post 610*c* was created.

A privacy indicator 632 is provided to display an indication of the visibility of the post 610*c*. In the illustrated example, the privacy indicator 632 indicates that the post 610*c* was posted to a shared private circle. A privacy indicator 634 indicates that the post 610*a* was posted publicly (e.g., not necessarily posted to any particular contact group). In some implementations, privacy indicators also indicate that a post was made to a shared public circle (not shown).

The posts 610*a*-610*d* are sorted according to the user's selection of either a "best" sort selector 636 or a "latest" sort selector 638. In some implementations, selecting the "latest" sort selector 638 causes the posts 610 to be sorted by age (e.g., according to the ages indicated by the age indicator 630) or by the age of the most recent comment to a post (e.g., actively discussed posts will remain near the head of the list). In some implementations, selecting the "best" sort selector 636 causes the posts 610*a*-610*d* to be sorted according to their quality, relevance, or other criteria. For example, posts can be ranked according to how often the user communicates with the poster, the number of "endorses" a post has received, how often an item linked to in the post is viewed, how closely the post aligns with topics of interest to the user, and combinations of these and/or other criteria that can be used to rank the quality of a post.

FIG. 6B depicts a screen-shot of an example "about" page 650 for a personal contact group. In general, the "about" page 650 is displayed when the "about" tab 651 is selected, and displays information about the selected contact group. A name banner 652 displays the name of the selected contact group, and selection of an edit link 654 displays an interface that the user can manipulate to edit the circle's name. A description banner 656 displays a description of the selected contact group, and selection of an edit link 658 displays an interface that the user can manipulate to edit the circle's description.

An interactivity options region 660 displays indications of the various ways in which members of the selected contact group can interact with the user. The interactivity options region 660 includes a chat indicator 662 to indicate that members of the selected circle can communicate with the user through a chat application (e.g., instant messenger client). An edit link 664 is provided that, when selected, provides the user with choices related to the availability of chat as a tool that members can use to contact the user. The interactivity options region 660 also includes a location visibility indicator 646 to indicate that members of the selected circle can determine the user's geographical location through a location sharing application (e.g., Google Latitude). An edit link 668 is provided that, when selected, provides the user with choices related how members of the selected circle can see the user's location (e.g., exact location, set location, city level location, no location).

The "about" page 650 includes a description region 670 that displays a general description of the type of contact group (e.g., personal, shared private, shared public) that the selected contact group is. A delete link 672, when selected, causes the selected contact group to be deleted.

Figure 6C:
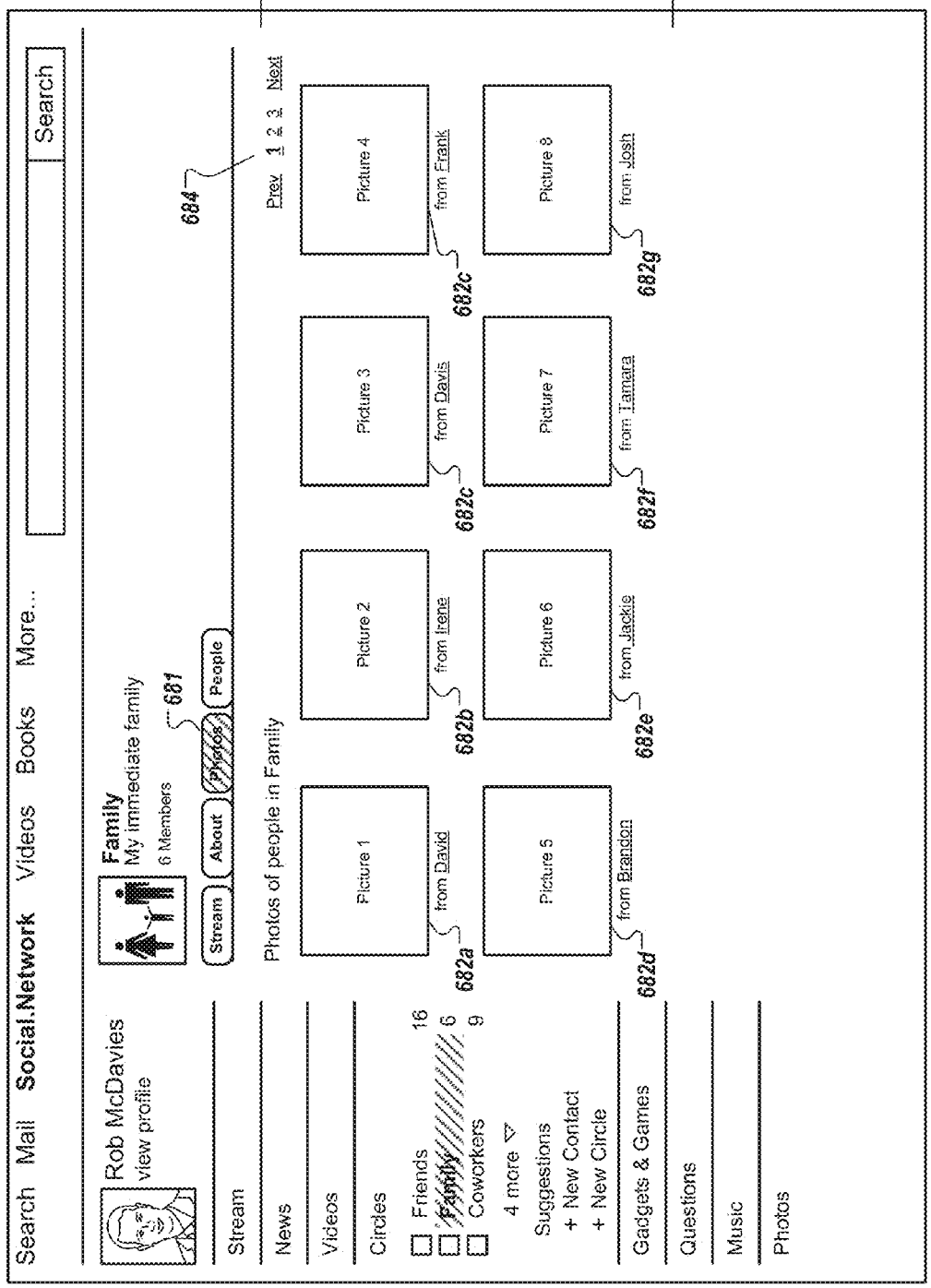
FIG. 6C depicts a screen-shot of an example photos page for a personal contact group.

FIG. 6C depicts a screen-shot of an example photos page 680 for a personal contact group. The photos page 680 is shown when a photos tab 681 is selected by the user, and displays a collection of photos 682. Additional photos (not shown) are brought into view by selecting various portions of a navigation control 684. In some implementations, the photos 682 include photos posted by members of the selected contact group. In some implementations, the photos 682 include photos of members of the selected contact group.

Figure 6D:
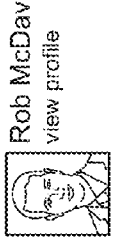
FIG. 6D depicts a screen-shot of an example people page for a personal contact group.

FIG. 6D depicts a screen-shot of an example people page 690 for a personal contact group. The people page 690 is shown when a people tab 691 is selected by the user. In some implementations, the people page 690 includes a collection of controls and indicators that are substantially similar to those included in the view/edit dialog box 460 of FIG. 4C.

Figure 7A:
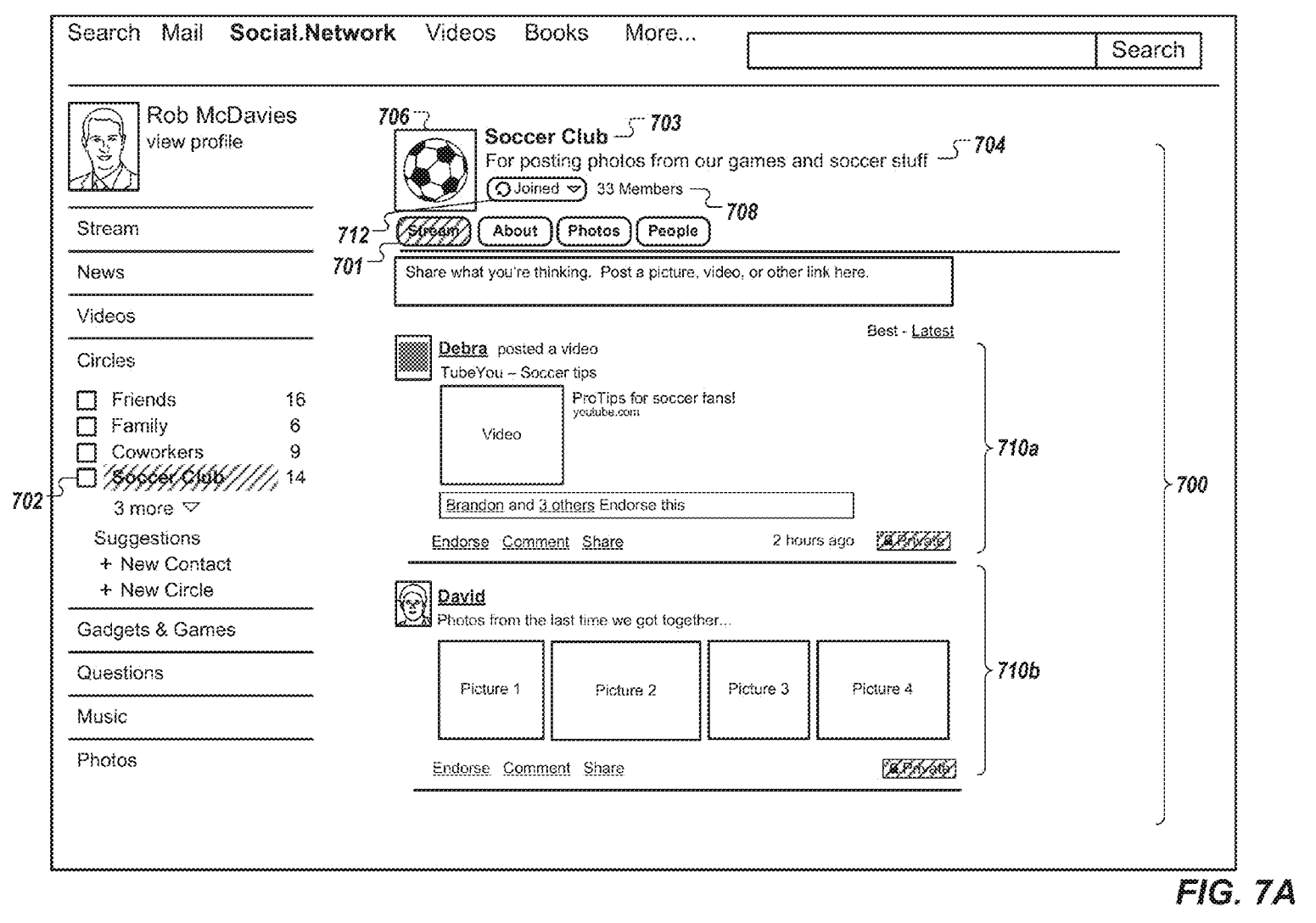

FIG. 7A depicts a screen-shot of an example stream page 700 for a private shared contact group. In general, the stream page 700 is displayed when the user selects one of the circle selectors and a stream tab 701 to show updates, comments, and other information that members of the selected contact group have posted. In the present example, the user has selected the "Soccer Club" circle selector 702.

The stream page 700, much like the stream page 600, includes a name block 703, a description block 704, an image 706, and a count indicator. An input box 710 is provided in which the user can enter information that will appear to other members of the selected contact group as an update (e.g., a post) when the other members view their social networking streams. The stream page 700 includes a number of posts 710*a*, 710*b*. The posts 710*a*, 710*b* include only the posts submitted by members of the selected contact group. The stream page also includes a membership status indicator 712. In some implementations, the status indicator 712 indicates the user's membership status in the selected contact group (e.g., joined, invited, owner).

Note that in the present example, the "soccer club" contact group is a shared private circle wherein a user creates the circle and then invites other contacts to become members. In some implementations, posts made to a shared private circle are visible only to contacts that have agreed to join the shared private contact group (e.g., the contacts will know that they will likely receive targeted updates).

Figure 7B:
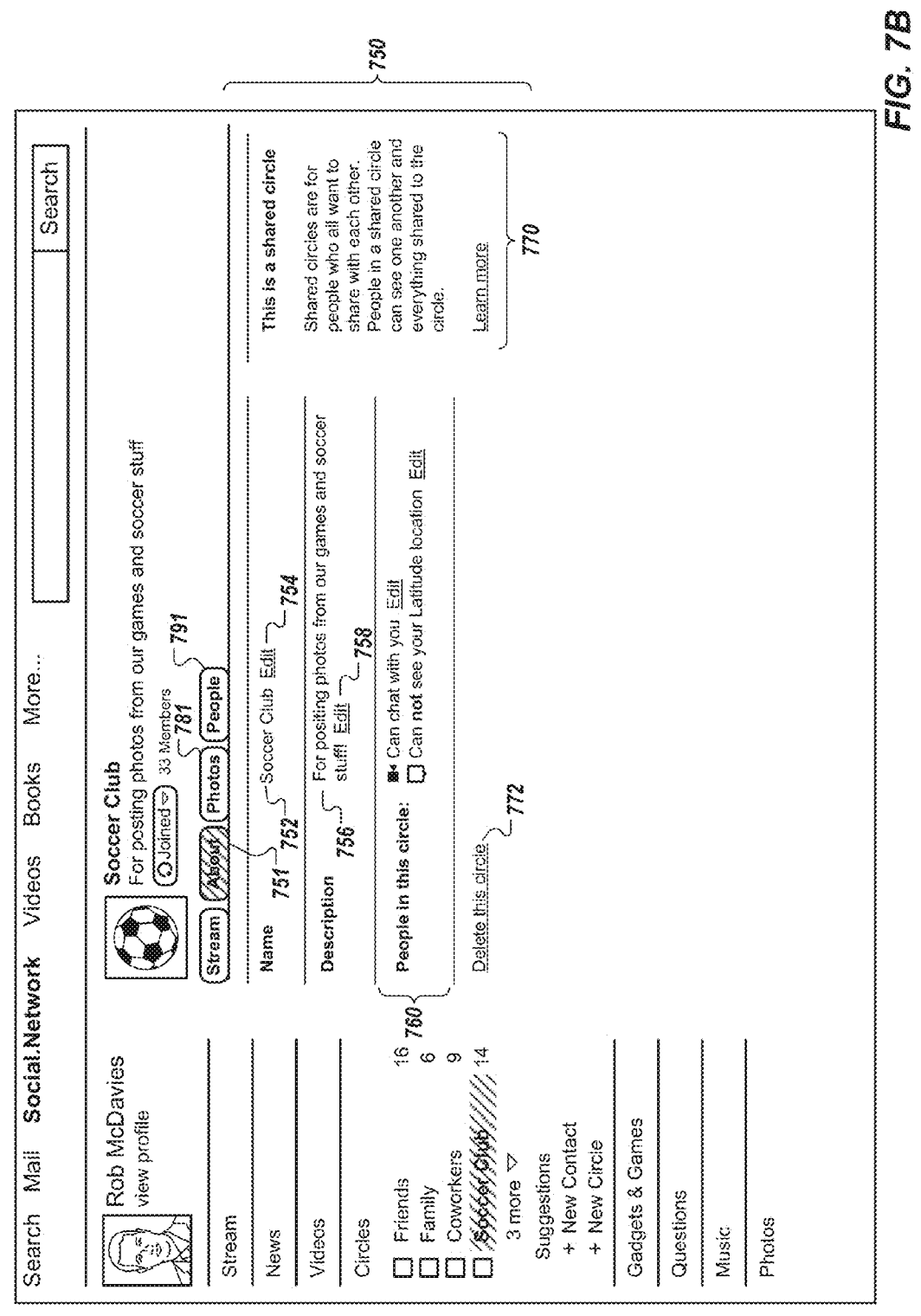

FIG. 7B depicts a screen-shot of an example "about" page 750 for a shared private contact group. In some implementations, the "about" page 750 is substantially similar in appearance and function to the "about" page 650 of FIG. 6B. In general, the "about" page 750 is displayed when the "about" tab 751 is selected, and displays information about the selected contact group. A name banner 752 displays the name of the selected contact group, and selection of an edit link 754 displays an interface that the user can manipulate to edit the circle's name. A description banner 756 displays a description of the selected contact group, and selection of an edit link 758 displays an interface that the user can manipulate to edit the circle's description. An interactivity options region 760 displays indications of the various ways in which members of the selected contact group can interact with the user.

The "about" page 750 includes a description region 770 that displays a general description of the type of contact group (e.g., personal, shared private, shared public) that the selected contact group is. A delete link 772, when selected, causes the selected contact group to be deleted. A tab 781, when selected, shows a photos page that is substantially similar in appearance and function to the photos page 680 of FIG. 6C, and an about tab 791, when selected, shows an "about" page that is substantially similar in appearance and function to the "about" page 690 of FIG. 6D.

Figure 8:
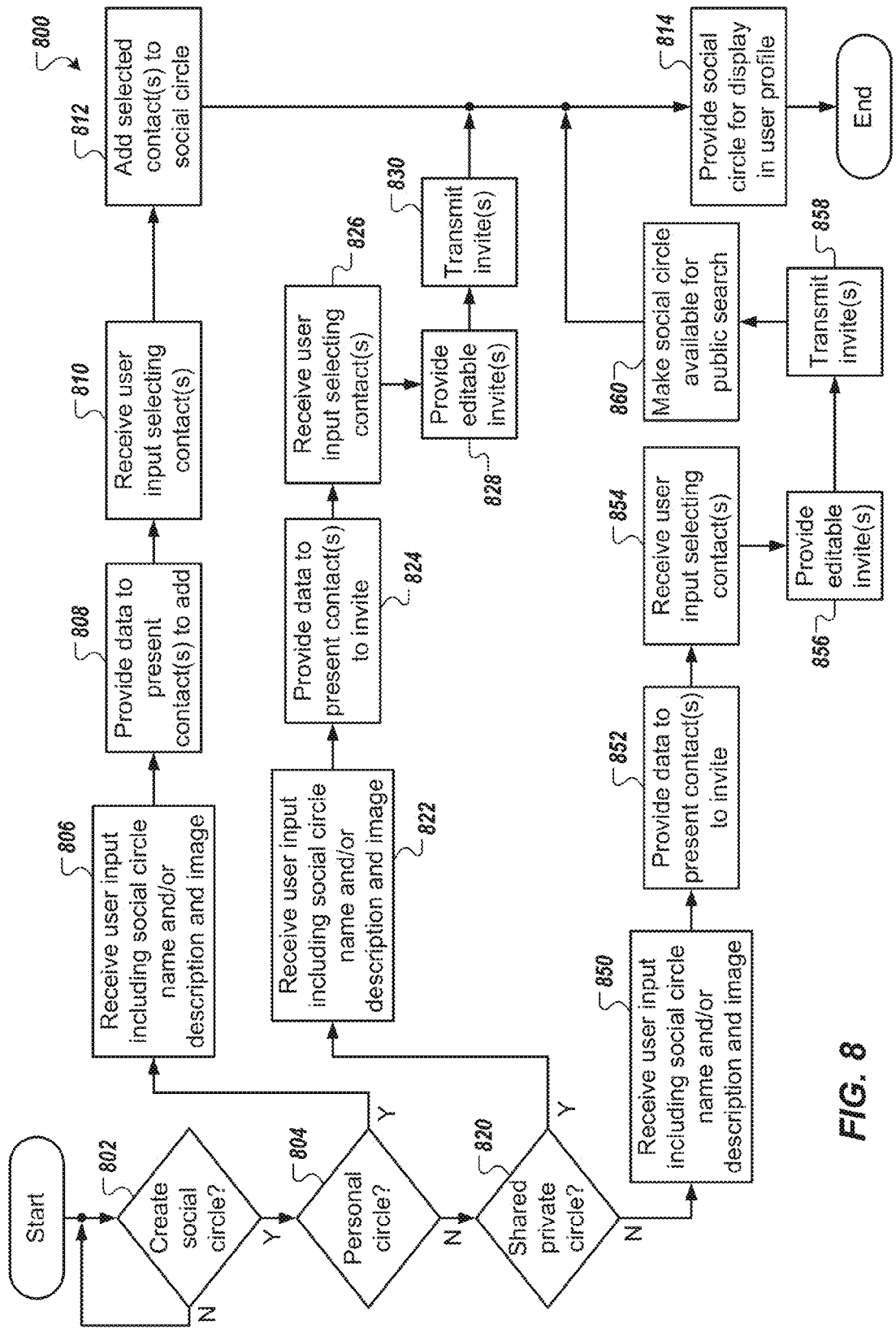
FIG. 8 is a flowchart illustrating an example process for creating a contact group using a social networking service.

FIG. 8 is a flowchart illustrating an example process 800 for creating a contact group using a social networking service. At step 802 a determination is made as to whether a contact group is to be created. For example, the user can indicate an initiate the creation of a contact group by dragging the selected contacts indicator 346 to the new circle region 350 or by clicking the new circle selector 351 of FIG. 3C. If, at step 802, it is determined that no circle is to be created (802-N), then the process 800 loops until such time that a circle is to be created.

At step 804, a determination is made whether the new contact group is to be a personal circle. For example, the user may click the selector 408 of FIG. 4A to indicate that a new circle is to be a personal contact group. If so, then at step 806 user input is received that includes the contact group's name and/or description and image. For example, the user may provide this information by entering it into the dialog box 400.

At step 808, data is provided to present one or more contacts to add to the new circle. For example, the dialog box 430 of FIG. 4B presents contacts that can be added to the circle. At step 810, user input is received for selecting one or more contacts that are to be added to the personal contact group. In the example of the dialog box 430 of FIG. 4B, the user has selected the contact icons 436*a*, 436*b* and 436*h*.

At step 812, the selected contact(s) are added to the new circle, and at step 814 the contact group is provided for display in the user profile. For example, the new circle can appear in the contact groups display 320 of FIG. 3A.

If, however, at step 804 a determination is made that the new contact group is not to be a personal circle (804-N), the process continues at step 820. At step 820, a determination is made whether the new contact group is to be a shared private circle. In the example, the user clicks the selector 508 of FIG. 5A to indicate that a new circle is to be a shared private contact group. If so, user input is received at step 822, the user input including the contact group's name and/or description and image. For example, the user provides this information by entering it into the dialog box 500.

At step 824, data is provided to present people profiles to add to the new circle. For example, the dialog box 530 of FIG. 5B presents contacts who can be added to the circle. At step 826, user input is received for selecting one or more contacts that are to be added to the circle.

At step 828, editable invitations are provided to the user. For example, the invitation that is shown in the invitation customization dialog box 560 of FIG. 5C shows the user a prototype invitation to the new contact group. The user is able to accept the default invitation, or may edit it. At step 830, the invitations are transmitted to the contacts selected in step 826. For example, the invitations may be sent in response to the user clicking the send button 566.

If, however, at step 820 a determination is made that the new contact group is not to be a shared private circle (e.g., the new circle is to be a shared public circle) (820-N), it is presumed that the new contact group will be a shared public circle and the process continues at step 850. At step 850, user input is received that includes the contact group's name and/or description and image.

At step 852, data is provided to present people profiles to add to the new circle. At step 854, user input is received for selecting one or more contacts that are to be added to the circle. At step 856, editable invitations are provided to the user. At step 858, the invitations are transmitted to the contacts selected in step 854.

At step 860, the new contact group is made available for public search. For example, a sports team can create a shared public circle as a social network in which their fans may associate. Once the contact group has been created, it can be made available for public search, and as such, additional fans may search for and discover the circle. The fans may then choose to join or request to join the circle. As members of the shared public circle, the fans may then associate with each other based on their shared interest in the sports team and possibly befriend each other thus expanding each fan's overall social network.

Figure 9:
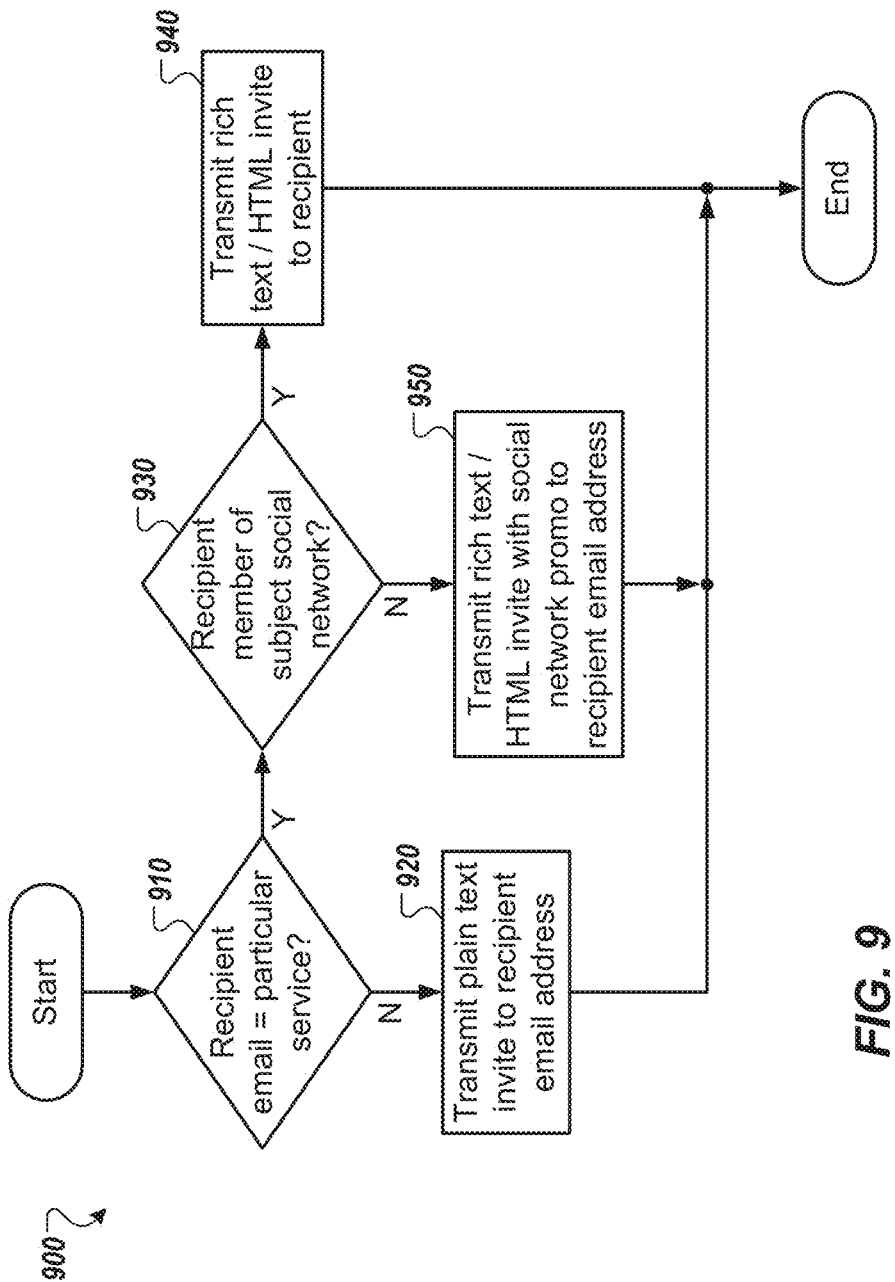
FIG. 9 is flowchart illustrating an example process for preparing and transmitting an invitation to a contact group.

FIG. 9 is flowchart illustrating an example process 900 for preparing and transmitting an invitation to a contact group. In some implementations, the process 900 is performed when the user clicks the send button 566 of FIG. 5C.

At step 910 a determination is made as to whether the recipient's email address is associated with a particular email service. For example, the recipient may be a member of the contact group networking system, or the recipient may not be a member but is associated with an email address that is known to be capable of accepting rich (e.g., HTML layout) emails, or the recipient may be associated with an unknown email service or one that is known to be better served by plain text emails.

If at step 910, it is determined that the recipient is not associated with a particular service (910-N), a plain text email invitation is transmitted to the recipient's email address at step 920. In some implementations, since the recipient's email address is not associated with a known (e.g., particular) email service, no assumption may be made as to whether the service can process and/or present any emails other than plain text emails. For example, to better ensure that the recipient can actually read the message through his service, a plain text invitation is sent.

If, however, at step 910, it is determined that the recipient's email address is associated with a particular service (910-Y), it is determined whether the recipient is a member of the subject social network at step 930. If the recipient is a member of the subject social networking service (930-Y), a rich text (e.g., HTML formatted) invitation is transmitted to the recipient at step 940.

If, however, at step 930 it is determined that the recipient is not a member of the subject social networking service (930-N), a rich text (e.g., HTML formatted) invitation that includes promotional material regarding the subject social network is transmitted to the recipient at step 950. For example, in the case of step 950, the recipient may be encouraged to accept the invitation and join the social networking service by being given additional information about the social networking service itself.

Figure 10:
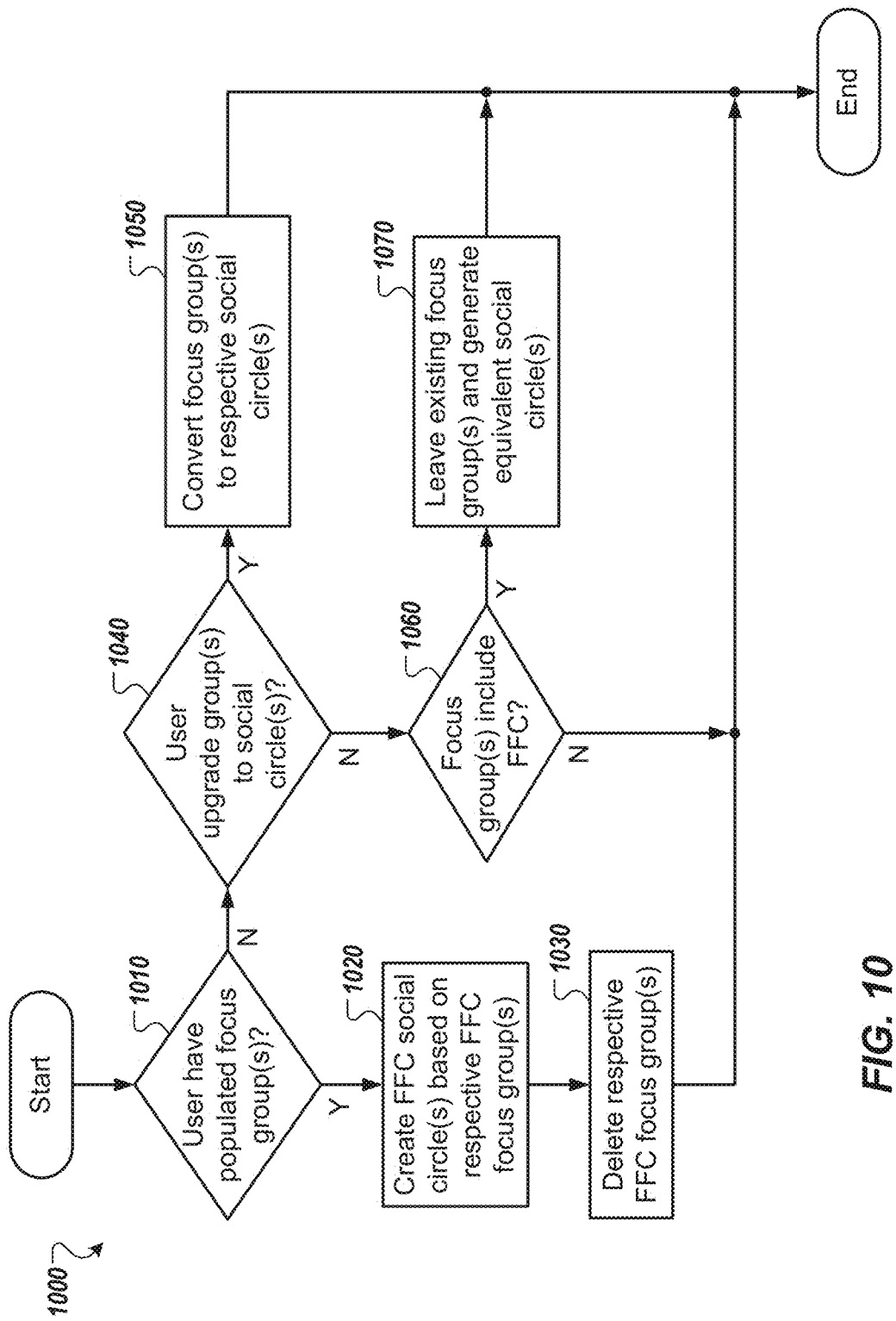
FIG. 10 is a flowchart illustrating an example process for generating a contact group from a legacy service.

FIG. 10 is a flowchart illustrating an example process 1000 for generating a contact group from a legacy service. In general, a networking services provider (e.g., network search provider, web hosting service, email hosting service, photo hosting service) may introduce a contact groups as part of a social networking service in addition to services that are already offered, and users of the existing services (e.g., prior to the availability of the contact groups) may have contacts, friends, followers, and the like, organized into focus groups. Three common examples of focus groups are "friends", "family", and "coworkers" (FFC). When the network services provider makes contact groups available for use, the existing users may wish to upgrade their focus groups to become contact groups complete with the contacts that were in their existing focus groups.

At step 1010, a determination is made as to whether a user has one or more populated focus groups. If so (1010-Y), new "friends", "family", and "coworkers" (FFC) contact groups are created at step 1020 based on the user's respective existing FFC focus groups. At step 1030, the corresponding, legacy FFC focus groups are deleted.

However, if at step 1010, it is determined that the user has no populated focus groups (1010-N), a determination is made at step 1040 as to whether the user wishes to upgrade focus groups to the contact groups (e.g., replace his focus groups with contact groups that are prepopulated with the contacts in his existing focus groups). If so (1040-Y), the focus group(s) are converted to respective contact groups at step 1050. If not (1040-N), a determination is made whether the focus groups include FFC focus groups at step 1060. If so, equivalent FFC contact groups are created and the existing focus groups are left substantially unaltered at step 1070. If not, at step 1060, no action is taken with respect to focus groups or contact groups.

Figure 11:
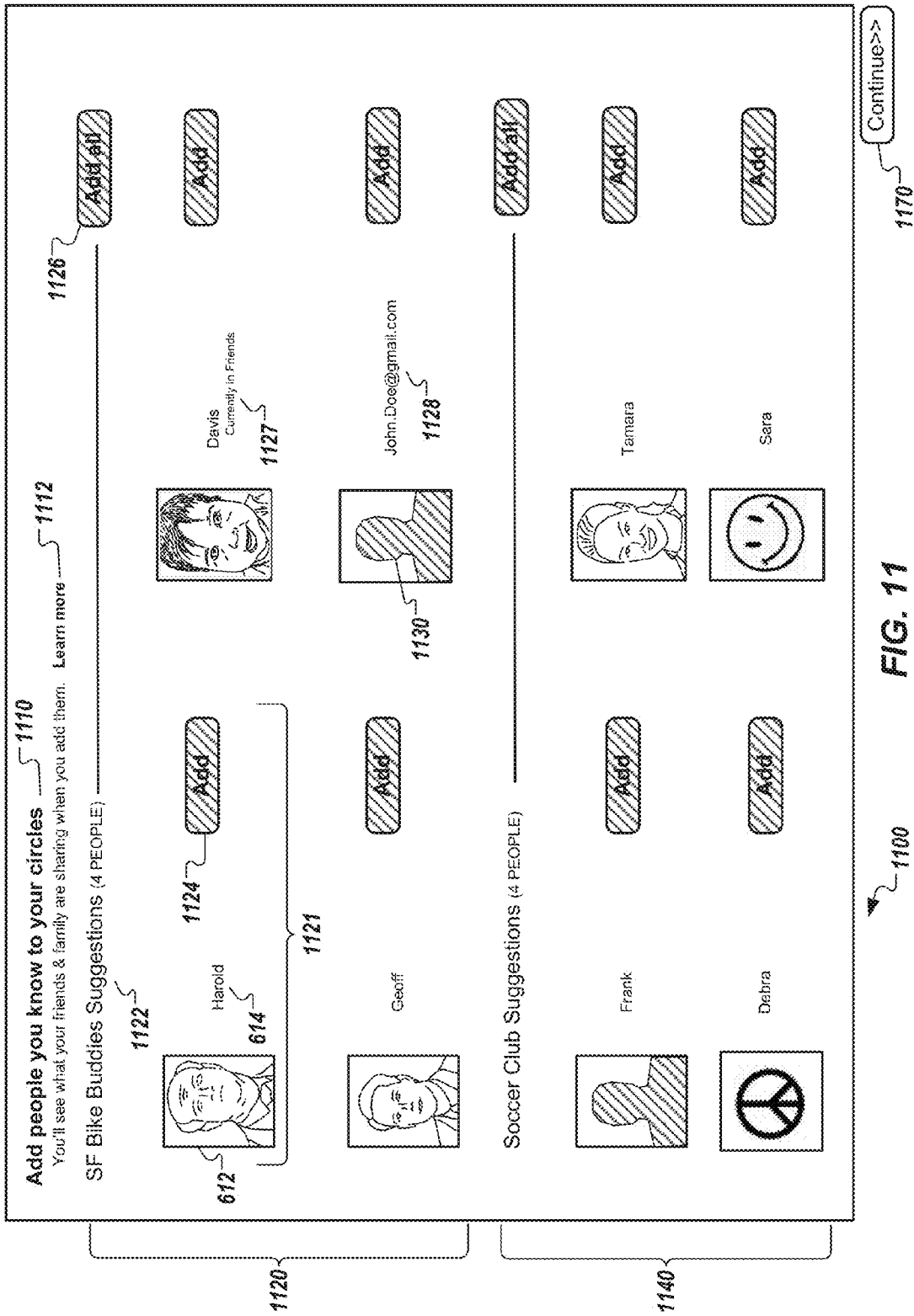
FIG. 11 depicts a screen-shot of an example suggestion page for a user of a social networking service.

FIG. 11 depicts a screen-shot of an example suggestion page 1100. In general, the suggestion page 1100 displays a plurality of contact icons, name banners, add buttons, and other information related to contact group suggestions. In some implementations, suggestion page 1100 is displayed when the user first logs in to the account. In other implementations, suggestion page 1100 is displayed when the user selects a suggestion selector in the UI 301.

Suggestion page 1100 includes a title banner 1110 informing the user of the purpose of the suggestions. In some implementations, suggestion page 1100 includes a learn more link 1112 that allows the user to receive more information regarding contact group suggestions by hovering, clicking, or otherwise selecting learn more link 1112.

Page 1100 includes contact group suggestion sections 1120 and 1140. Each contact group suggestion section contains one or more contact suggestions 1121 for adding the suggested contact as a member of the specific contact group of the section. In the current example, contact group suggestion section 1120 includes label banner 1122 informing the user of the contact group to which each contact suggestion in the section would be added. In some implementations, label banner 1122 includes a count of the total number of suggestions included in the section.

In the current example, section 1120 contains four suggestions: Harold, Geoff, Davis, and John.Doe@gmail.com. Each suggestion 1121 includes a contact icon 612 along with a corresponding name banner 614 and a corresponding add button 1124. In some implementations, a contact does not have an image for display. Hence, in those implementations, the contact icon 612 is represented using a generic shadow silhouette, corresponding to an anonymous image, e.g. contact icon 1130. In some implementations, name banner 614 is a link to the profile page of the suggested contact. In some embodiments, name banner 614 also includes other information 1127. In the current example, the name banner for Davis includes additional information 1127 informing the user that Davis is currently in the Friends circle. In some implementations, name banner 614 is replaced with another form of identifier, such as an email address (1160). This occurs when the contact group suggestion is not yet a member of the social network or if the interactions between the contact group and the contact group suggestion occurred via an email address that cannot be traced back to a user profile, e.g. a separate email address not linked to a social network account. In such cases, the contact icon 612 correlated to the email address 1160 is a shadow image 1130 representing an anonymous person represented only by email address 1160, which in this case, is John.Doe@gmail.com. In some implementations, since the contact represented by only the email address is not identified with a social network profile, adding (by clicking, hovering over, or otherwise selecting of the add button 1124) the suggested contact includes first sending an invite to join the social network and then adding the suggested contact to the contact group once the contact has joined the social network.

Example suggestion page 1100 displays, as an example, two sections of contact group suggestions. Each section, 1120 and 1140, corresponds to a specific contact group, SF Bike Buddies and Soccer Club, respectively. The user is presented each contact suggestion 1121 and can pick and choose which contact to add to the specific circle suggested. In some implementations, suggestion page 1100 includes an add all button 1126 for each suggestion section. By clicking, hovering over, or otherwise selecting the add all button 1126, the user can conveniently add all suggestions in a specific section to the suggested circle corresponding to that section. In the current example, user selection of the add all button 1126 corresponding to section 1120 would add Harold, Davis, Geoff, and John.Doe@gmail.com to SF Bike Buddies (as discussed above, in some implementations, adding John.Doe@gmail.com to the SF Bike Buddies might first require automatically sending an invite to the social network). Whether or not the user chooses to add any contact group suggestions has no bearing on the user's ability to move on to the next page. In other words, the user can choose to ignore some or all suggestions and simply move on by clicking, hovering over, or otherwise selecting continue button 1170. In some implementations, the suggestion page 1100 requires a response to the suggestions from the user in order to move on. In other implementations, a response is completely optional.

Figure 12:
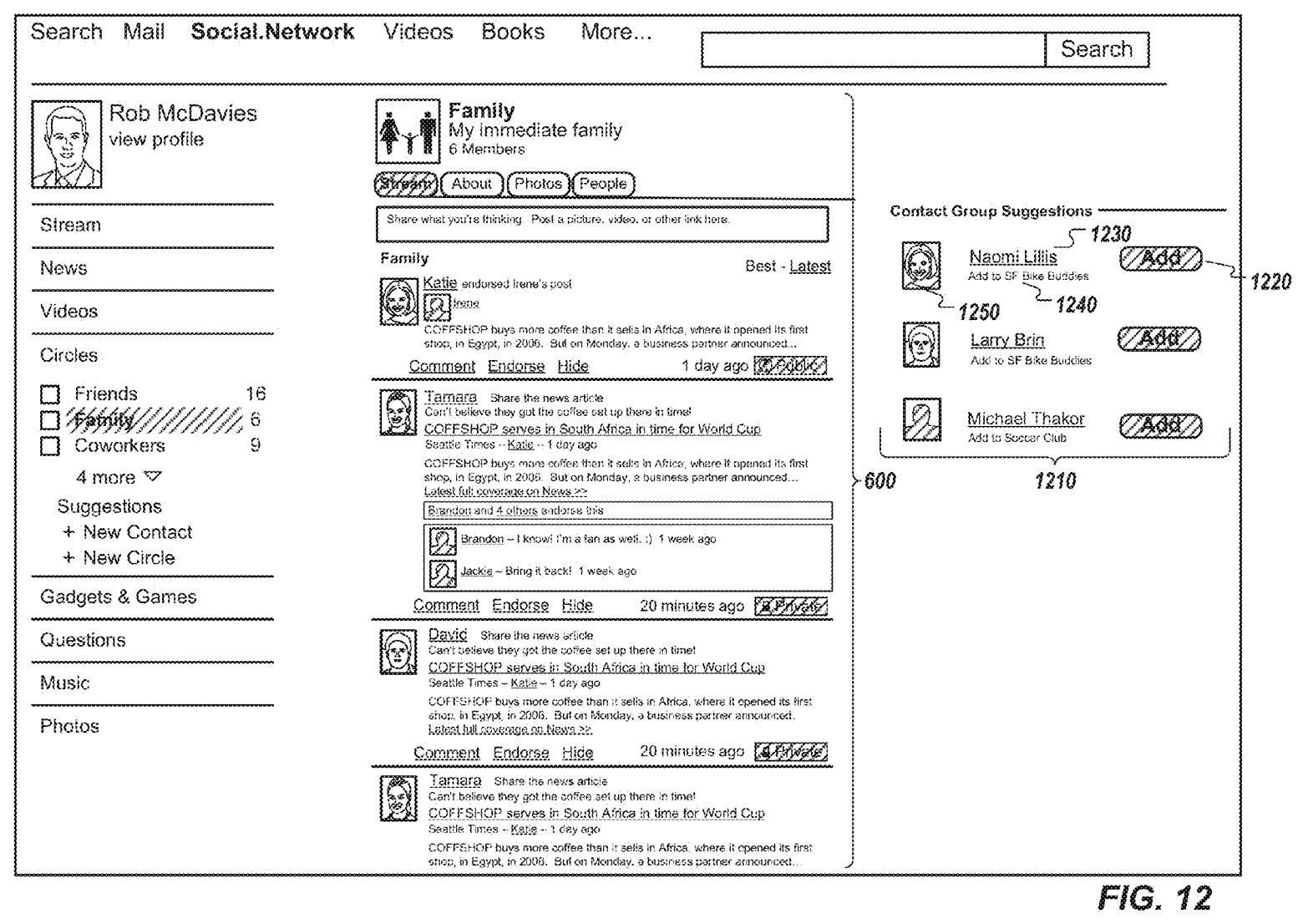

FIG. 12 shows a screenshot of an example stream page with a suggestion column in accordance with an embodiment of the present disclosure. FIG. 12 is similar to FIG. 6A, with the exception of additional contact group suggestion column 1210. FIG. 12 shows just one example of how contact group suggestions can be displayed to the user. As shown above, another way of displaying contact suggestions is to display a contact suggestion page, e.g. contact suggestion page 1100.

In FIG. 12, contact group suggestion column 1210 is displayed to the right of stream 600. However, in other implementations, the contact suggestions can occur anywhere on the example stream page, e.g. a horizontally or vertically. Still in other implementations, contact suggestions can occur in a pop up window, either prompted by a user selection or occurring randomly as a contact suggestion is generated. In some implementations, contact group suggestion column 1210 is capable of being moved around the page according to user preference.

Each contact suggestion includes a contact icon 1250, a name banner 1230, and an add button 1220. In some implementations, a contact suggestion includes additional information 1240 informing the user of the contact group to which the contact is suggested to be added. For example, additional information 1240 in FIG. 12 tells the user that Naomi Lillis is a suggested contact to add to SF Bike Buddies. Thus, if the user clicks, hovers over, or otherwise selects the add button, the user adds Naomi Lillis to SF Bike Buddies. In some implementations, contact group suggestion column 1210 includes an optional add all button (not shown), similar to add all button 1126 for adding all contact group suggestions to the contact group specified by additional information 1240.

Now that an overview has been provided, an exemplary system that supports the functionality described above is provided in conjunction with FIG. 13. The system is preferably a computer system 1310 having:

- a central processing unit 1322;
- a main non-volatile storage unit 1314, for example, a hard disk drive, for storing software and data, the storage unit 1314 controlled by controller 1312;
- a system memory 1336, preferably high speed random-access memory (RAM), for storing system control programs, data, and application programs, comprising programs and data loaded from non-volatile storage unit 1314; system memory 1336 may also include read-only memory (ROM);
- a user interface 1332, comprising one or more input devices (e.g., keyboard 1328) and a display 1326 or other output device;
- a network interface card 1320 or other communication circuitry for connecting to any wired or wireless communication network 1334 (e.g., the Internet or any other wide area network);
- an internal bus 1330 for interconnecting the aforementioned elements of the system; and
- a power source 1324 to power the aforementioned elements.

Operation of computer 1310 is controlled primarily by operating system 1340, which is executed by central processing unit 1322. Operating system 1340 can be stored in system memory 1336. In addition to operating system 1340, in a typical implementation, system memory 1336 can include one or more of the following:

- file system 1342 for controlling access to the various files and data structures;
- a graphical user interface 1344 for display to a user;
- a profile database 1346, including a contacts database 1348, and a contact group database 1352; contacts database 1348 including stored information corresponding to contacts 1350; contact group database 1352 including stored information corresponding to contacts groups 1354, each contact group consisting of one or more contact group members; in some implementations, contact group members are limited to contacts 1350 stored in contacts database 1348; in other implementations, some contact group members are not part of contacts database 1348;
- historical interactions 1356 including information corresponding to interactions between a user, a contact group, and another user not already part of the contact group; in some implementations, historical interactions 1356 comprise data structures storing implicit groups 1357 and all interactions between implicit groups 1357 and the user; and
- a contact suggestion generation module 1358 for creating a plurality of contact group suggestions based on historical interactions 1356, each contact group suggestion comprising a contact group 1354 and a contact 1350.

Figure 13:
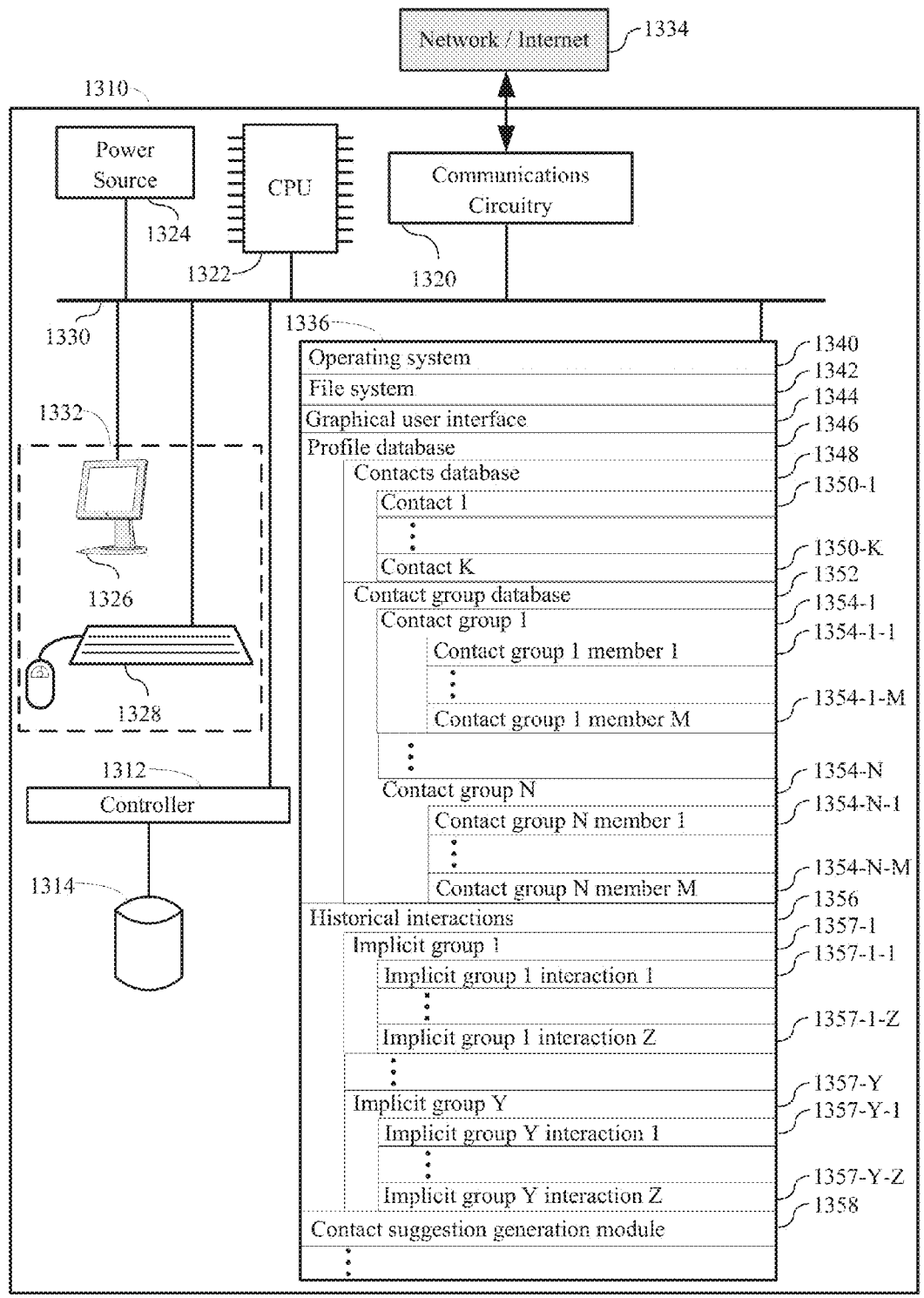
FIG. 13 is an example server for generating contact group suggestions in a social networking service in accordance with some embodiments.

As illustrated in FIG. 13, computer 1310 comprises software program modules and data structures. The data structures stored in computer 1310 include, for example, contacts database 1348 and historical interactions 1356. Each of these data structures can comprise any form of data storage including, but not limited to, a flat ASCII or binary file, an Excel spreadsheet, a database. In some embodiments, the information in contacts database 1348 and historical interactions 1356 are each a single data structure. In some embodiments, contacts database 1348 and/or historical interactions 1356, in fact, comprises a plurality of data structures (e.g., databases, files, archives) that may or may not all be hosted by computer 1310. For example, in some embodiments, contacts database 1348 and/or historical interactions 1356 comprises a plurality of structured and/or unstructured data records that are stored either on computer 1310 and/or on computers that are addressable by computer 1310 across network/Internet 1334.

In some embodiments, the data structures are distributed across one or more computers that are addressable by computer 1310 by network/Internet 1334. Thus, in some embodiments, one or more of such data structures is hosted by one or more remote computers (not shown). Such remote computers can be located in a remote location or in the same room or the same building as computer 1310. In some embodiments, the software modules illustrated in FIG. 13 are stored in computer 1310. In some embodiments, all or a portion of one or more of the software modules illustrated in FIG. 13 are not stored in computer 1310 but rather are stored in one or more computers or electronic storage devices that are addressable by computer 1310. As such, any arrangement of the data structures and software modules illustrated in FIG. 13 on one or more computers is within the scope of the disclosure so long as these data structures and software modules are addressable by computer 1310 across network/Internet 1334 or by other electronic means. Moreover, other systems, application modules and databases not shown in FIG. 13 can be stored in system memory 1336. Thus, the present disclosure fully encompasses a broad array of computer systems. Moreover, computer 1310 may in fact comprise a plurality of servers that are in electrical communication with each other and that each contains one or more of the software modules and/or data structures illustrated in FIG. 13.

Figure 14:
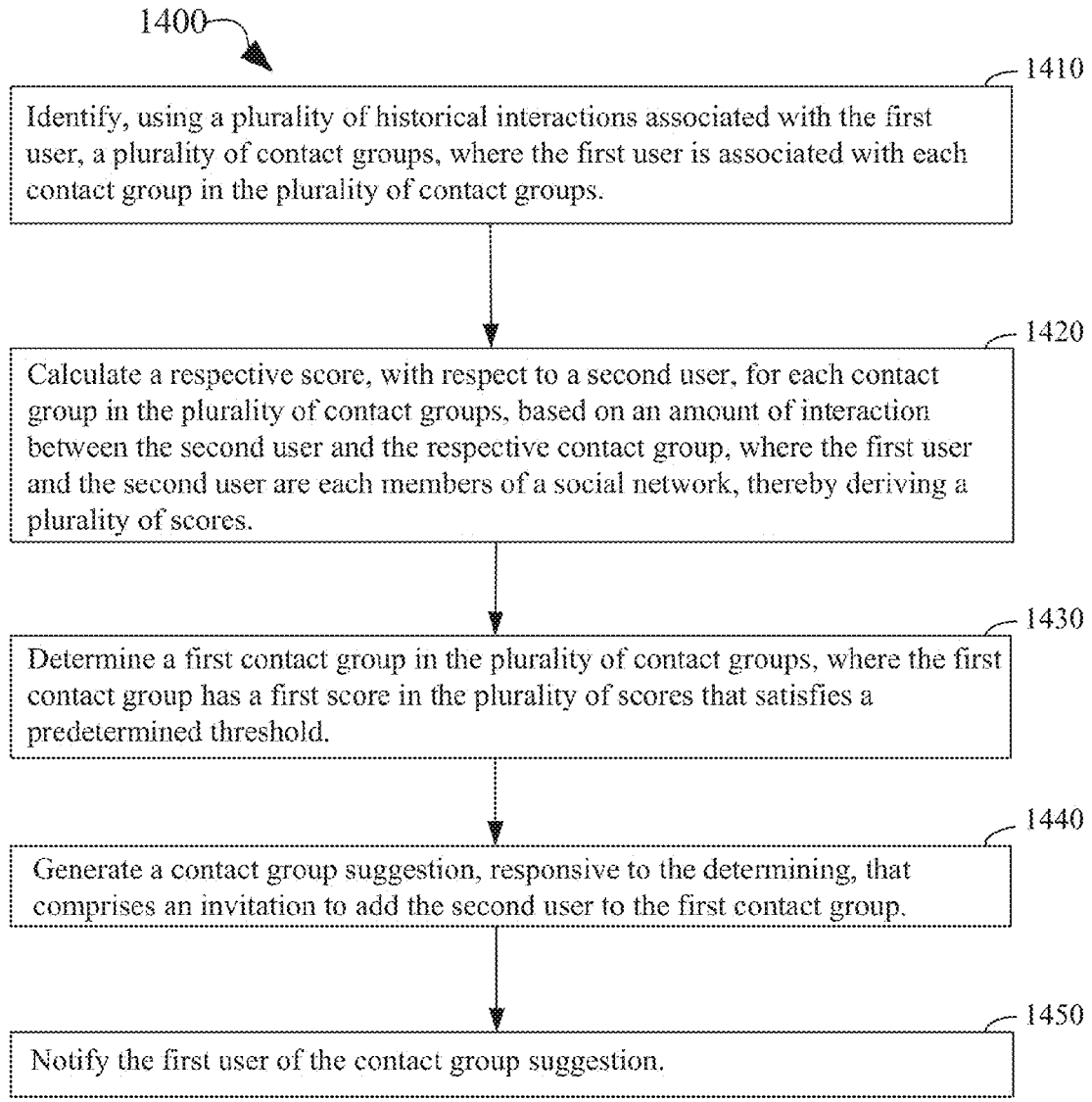
FIG. 14 is a flowchart illustrating an example process for generating a contact group suggestion in a social networking service.

Now that an overview of a system in accordance with one embodiment of the present disclosure has been described, various advantageous methods that can be used in accordance with the present disclosure will now be disclosed. In particular, FIG. 14 is a flowchart illustrating an example process 1400 for generating a contact group suggestion in a social networking service. First, a plurality of contact groups from contact group database 1352 is identified by contact suggestion generation module 1358 using a plurality of historical interactions 1356 associated with a first user (1410). Each contact group is associated with the first user. For example, SF Bike Buddies and Soccer Club are identified based on interactions the first user had with SF Bike Buddies and Soccer Club. A historical interaction can be any form of electronic communication between the first user and the respective contact group, e.g. posting a message or media to the social network, replying to a post on the social network, commenting on a post on the social network, clicking a user interface button to indicate a preference for a particular post on the social network, replying to an email, forwarding an email, sending an instant message, receiving an instant message, participating in an IP based video conference, sharing an electronic file over an Internet connection, or adding a contact to the social network.

Next, contact suggestion generation module 1358 calculates a score, with respect to a particular second user, for each contact group based on an amount of interaction between the second user and the respective contact group (1420). In some implementations, the second user is a contact 1350 from contact database 1348. In other words, for a respective contact in contact database 1348, e.g. Naomi Lillis, a score is calculated for SF Bike Buddies and a different score is calculated for Soccer Club. The amount of historical interactions is directly related to the score. For example, if the first user has posted to the combination of SF Bike Buddies and Naomi Lillis many more times than the combination of Soccer Club and Naomi Lillis, than SF Bike Buddies will receive a much higher score, with respect to Naomi Lillis, than Soccer Club and vice versa.

In some implementations, contact suggestion generation module 1358 first identifies implicit groups 1357 in historical interactions 1356. Implicit groups include a contact group and a second user. In some implementations, the second user is a contact of the first user. Implicit groups receive a score based on the historical interactions between the first user, the contact group of the implicit group, and the second user of the implicit group. Implicit groups are a way of facilitating generation of contact group suggestions by first clustering contact groups and other users based on their interactions. Since, only implicit groups are given scores, this eliminates the need to provide a score for every contact group with respect to a second user, e.g. giving scores of zero to contact groups that have no interaction with the second user.

After a score is calculated for each group, a contact group with a score that satisfies a predetermined threshold, with respect to the second user, is determined by contact suggestion generation module 1358 to be a first contact group (1430). For example, if the required threshold score is 50, then a contact group with a score of 50 and above is chosen. In the example above, if SF Bike Buddies receives a score of 78 and Soccer Club receives a score of 47, both with respect to Naomi Lillis, then SF Bike Buddies is chosen as the first contact group. In example, in cases where both groups are above the predetermined threshold, either one could be chosen as the first group. In the implementations that utilize implicit groups, Naomi Lillis and SF Bike Buddies form an implicit group based on their interactions with the first user. In such cases, the implicit group receives a score and if the score is high enough, the contact group of the implicit group is determined to be the first contact group. In some implementations, determining the first contact group includes verifying that the first contact group includes a user, other than the first and second user, that is also in an implicit group. In cases where none of the groups are chosen because none of the groups meets the required threshold, no contact suggestion can be made. In such cases, in some implementations, contact suggestion generation module 1358 waits until more historical interactions push the score of at least one contact group equal to or above the threshold. In other implementations, the absence of contact groups that meet the minimum threshold triggers the contact suggestion generation module 1358 to adjust the threshold to a lower value.

In some embodiments, there is no minimum threshold. In such cases, the first score for the first contact group satisfies the "predetermined threshold" when the first score is greater than a score generated for any other contact group in the plurality of contact groups. In other embodiments, the first score for the first contact group satisfies the predetermined threshold when the second user has had at least a predetermined threshold number of interactions with the first contact group during a predetermined period of time. In some embodiments, the predetermined threshold number of interactions is two or more interactions. In some embodiments, the predetermined threshold number of interactions is three or more interactions. In some embodiments, the predetermined threshold number of interactions is four or more interactions.

Next, contact suggestion generation module 1358 generates a contact group suggestion using the first contact group (1440) and the first user is notified of the contact group suggestion (1450). In some implementations, before generating the contact group suggestion, the contact suggestion generation module 1358 make sure that the second user is not already a member of the first contact group. The contact group suggestion comprises an invitation to add the second user to the first contact group. Thus, in the examples given, if SF Bike Buddies receives a score of 78 with respect to Naomi Lillis and the threshold is 50, then contact suggestion generation module 1358 generates a contact group suggestion of Naomi Lillis and SF Bike Buddies. The first user is then notified of the suggestion to add Naomi Lillis to SF Bike Buddies. The contact suggestion is displayed in Graphical User Interface 1344, e.g. via suggestion page 1100 or suggestion column 1210, in accordance with the examples described above with reference to FIGS. 11 and 12. In some embodiments, notifying the first user of the contact group suggestion includes providing a pop-up window to the first user that includes the contact group suggestion, presenting the contact group suggestion in a designated window or area of a window, providing the contact group suggestion in a message or email to the first user, presenting the contact group suggestion in text, or presenting the contact group suggestion graphically. In some embodiments, contact suggestion generation module 1358 first verifies, at a time prior to notifying the first user of the contact group suggestion, that the first user has not already received a contact group suggestion that comprises an invitation to add the first user to the first contract group. In other embodiments, a contact group suggestion can be displayed several times to the user.

In some embodiments, the entire process is then repeated for each contact or second user in the profile database 1346 or historical interactions 1356. In implementations utilizing implicit groups, the process is only performed for each implicit group formed.

In some embodiments, each respective interaction by the second user with the first contact group is weighted by a decayed interaction value, where the decayed interaction value decreases as a function of time that has elapsed since the respective interaction took place. In other words, each interaction becomes less relevant as time passes. This also means more weight is put on more recent interactions. The reason for this decay in value over time is to keep the suggestions current with the user's activities. In some embodiments, the decayed interaction value itself ranges from a first value, when the respective interaction by the second user with the first contact group took place within a first time period, to a second value, when the respective interaction by the second user with the first contact group took place after a second time period.

In some embodiments, the number of times a contact group suggestion is displayed affects the score of the contact group. This is because the system assumes that if a user sees the displayed contact group suggestion and then ignores the suggestion for whatever reason, then the user is implicitly rejecting the contact group suggestion. In such cases, calculating a respective score in the plurality of scores for a contact group i in the plurality of contact groups with respect to the second user j comprises computing:

$$score_{ij} = w_{1ij} RCGS_{ij} - w_{2ij} IRC_{ij}$$

wherein $score_{ij}$ is the respective score for the contact group i with respect to the second user j, $RCGS_{ij}$ is a raw contact group score for the contact group i with respect to the second user j, $IRC_{ij}$ is an implicit rejection count for the contact group i with respect to the second user j, $w_{1ij}$ is a weight for $RCGS_{ij}$; and $w_{2ij}$ is an implicit rejection multiplier for $IRC_{ij}$.

Thus, if a user sees a contact group suggestion and ignores the suggestion, then the system will decrease the score. If the user sees the suggestion a second time and still ignores the suggestion, the system decreases the score yet again. In some implementations, the score decreases in such a manner until the user adds the suggestion or until the score falls below the threshold. In some implementations, graphical user interface 1344 displays a "reject" button (not shown) next to the contact group suggestion in order for the user to actively/explicitly reject the contact group suggestion. Upon an active/explicit rejection of the suggestion, the score for the group is instantly set to zero and the contact group suggestion is no longer generated. In some implementations, an active/explicit rejection bars the contact group suggestion from ever generating again. In other implementations, an active/explicit rejection simply zeroes out the score and the specific contact group suggestion is still capable of being generated in the future, based on more historical interactions.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the present disclosure can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the present disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

In some implementations, a contact group suggestion is generated for a first user, using a method performed at a computer system having one or more processors and memory storing one or more programs to be executed by the one of more processors. The method includes: identifying, using a plurality of historical interactions associated with the first user, a plurality of contact groups, wherein the first user is associated with each contact group in the plurality of contact groups; calculating a respective score, with respect to a second user, for each contact group in the plurality of contact groups, based on an amount of interaction between the second user and the respective contact group, wherein the first user and the second user are each members of a social network, thereby deriving a plurality of scores; determining a first contact group in the plurality of contact groups, wherein the first contact group has a first score in the plurality of scores that satisfies a predetermined threshold; generating a contact group suggestion, responsive to the determining, that comprises an invitation to add the second user to the first contact group, and notifying the first user of the contact group suggestion.

In some implementations, the aforementioned method further comprises forming one or more implicit group from the plurality of historical interactions, wherein each respective implicit group in the one or more implicit groups comprises the second user and a respective third user in the social network.

In some implementations, the aforementioned determining further comprises verifying that the first contact group includes a user, other than the first user and second user, that is also in an implicit group in the one or more implicit groups.

In some implementations, in aforementioned method, at a time prior to the generating, the second user is not a member of the first contact group.

In some implementations, in the aforementioned method, the first score for the first contact group satisfies the predetermined threshold when the first score is greater than a score generated for any other contact group in the plurality of contact groups.

In some implementations, in the aforementioned method, the first score for the first contact group satisfies the predetermined threshold when the second user has had at least a predetermined threshold number of interactions with the first contact group during a predetermined period of time.

In some implementations of the aforementioned method, each respective interaction by the second user with the first contact group is weighted by a decayed interaction value, wherein the decayed interaction value decreases as a function of time that has elapsed since the respective interaction took place and wherein the respective interaction weighted by the decayed interaction value is used to calculate the first score for the first contact group.

In some implementations of the aforementioned method, the decayed interaction value ranges from a first value, when the respective interaction by the second user with the first contact group took place within a first time period, to a second value, when the respective interaction by the second user with the first contact group took place after a second time period.

In some implementations of the aforementioned method, the plurality of historical interactions comprises posting a message or media to the social network, replying to a post on the social network, commenting on a post on the social network, clicking a user interface button to indicate a preference for a particular post on the social network, replying to an email, forwarding an email, sending an instant message, receiving an instant message, participating in an IP based video conference, sharing an electronic file over an Internet connection, or adding a contact to the social network.

In some implementations of the aforementioned method, notifying the first user of the contact group suggestion includes providing a pop-up window to the first user that includes the contact group suggestion, presenting the contact group suggestion in a designated window or area of a window, providing the contact group suggestion in a message or email to the first user, presenting the contact group suggestion in text, or presenting the contact group suggestion graphically.

In some implementations of the aforementioned method, calculating a respective score in the plurality of scores for a contact group i in the plurality of contact groups with respect to the second user j comprises computing:

$$score_{ij} = w_{1ij} RCGS_{ij} - w_{2ij} IRC_{ij}$$

wherein
$score_{ij}$ is the respective score for the contact group i with respect to the second user j,
$RCGS_{ij}$ is a raw contact group score for the contact group i with respect to the second user j,
$IRC_{ij}$ is an implicit rejection count for the contact group i with respect to the second user j,
$w_{1ij}$ is a weight for $RCGS_{ij}$; and
$w_{2ij}$ is an implicit rejection multiplier for $IRC_{ij}$.

In some implementations of the aforementioned method, the method further comprises verifying, at a time prior to notifying the first user of the contact group suggestion, that the first user has not received a contact group suggestion that comprises an invitation to add the first user to the first contract group.

In some implementations of the aforementioned method, the method further comprises repeating the scoring, determining, generating, and notifying for each second user in a plurality of second users.

In some implementations of the aforementioned method, the decayed interaction value decreases at a variable rate over time.

In some implementations, a system for generating a contact group suggestion for a first user comprises: one or more central processing units for executing programs; memory storing one or more programs be executed by the one or more central processing units; the one or more programs comprising instructions for: identifying, using a plurality of historical interactions associated with the first user, a plurality of contact groups, wherein the first user is associated with each contact group in the plurality of contact groups; calculating a respective score, with respect to a second user, for each contact group in the plurality of contact groups, based on an amount of interaction between the second user and the respective contact group, wherein the first user and the second user are each members of a social network, thereby deriving a plurality of scores; determining a first contact group in the plurality of contact groups, wherein the first contact group has a first score in the plurality of scores that satisfies a predetermined threshold; generating a contact group suggestion, responsive to the determining, that comprises an invitation to add the second user to the first contact group, and notifying the first user of the contact group suggestion.

In some implementations, a non-transitory computer readable medium stores one or more programs configured for execution by a computer, the one or more programs comprising instructions for: identifying, using a plurality of historical interactions associated with the first user, a plurality of contact groups, wherein the first user is associated with each contact group in the plurality of contact groups; calculating a respective score, with respect to a second user, for each contact group in the plurality of contact groups, based on an amount of interaction between the second user and the respective contact group, wherein the first user and the second user are each members of a social network, thereby deriving a plurality of scores; determining a first contact group in the plurality of contact groups, wherein the first contact group has a first score in the plurality of scores that satisfies a predetermined threshold; generating a contact group suggestion, responsive to the determining, that comprises an invitation to add the second user to the first contact group, and notifying the first user of the contact group suggestion.

We claim:

1. A method of generating a contact group suggestion for a first user, the method comprising:
at a computer system having one or more processors and memory storing one or more programs to be executed by the one of more processors:
identifying, using a plurality of historical electronic interactions associated with the first user, a plurality of contact groups identified from contacts in a contact group database, wherein the first user is associated with each contact group in the plurality of contact groups and wherein at least one contact group in the plurality of contact groups was identified automatically without explicit instruction from the first user,
calculating a respective score, with respect to a second user obtained from a contact database, for each respective contact group in the plurality of contact groups, based on an amount of historical electronic interaction between the second user and members of the respective contact group recorded in a historical interactions database thereby deriving a plurality of scores, wherein
the first user and the second user are each members of a social network, and
the amount of historical electronic interaction between the second user and members of the respective contact group is determined, at least in part, by a number of times the first user has electronically interacted with the combination of the second user and members of the respective contact group;
the score for a respective contact group in the plurality of contact groups is decreased by an amount when the first user has been presented with a suggestion to add the second user to the respective contact group on a previous occasion;
determining a first contact group in the plurality of contact groups, wherein the first contact group has a first score in the plurality of scores that satisfies a predetermined threshold;
generating a contact group suggestion, responsive to the determining, that comprises an invitation to add the second user to the first contact group, wherein, at a time prior to the generating, the second user is not a member of the first contact group; and
electronically notifying the first user of the contact group suggestion.

2. The method of claim 1, further comprising: forming a plurality of implicit groups from the plurality of historical electronic interactions, wherein each respective implicit group in the plurality of implicit groups comprises the second user and a respective third user in the social network.

3. The method of claim 1, wherein the determining further comprises: verifying that the first contact group includes a user, other than the first user and second user, that is also in an implicit group in the plurality of implicit groups.

4. The method of claim 1, wherein the first score for the first contact group satisfies the predetermined threshold when the first score is greater than a score generated for any other contact group in the plurality of contact groups.

5. The method of claim 1, wherein the first score for the first contact group satisfies the predetermined threshold when the second user has had at least a predetermined threshold number of electronic interactions with the first contact group during a predetermined period of time.

6. The method of claim 5, wherein each respective electronic interaction by the second user with the first contact group is weighted by a decayed interaction value, wherein the decayed interaction value decreases as a function of time that has elapsed since the respective interaction took place.

7. The method of claim 6 wherein the decayed interaction value ranges from a first value, when the respective electronic interaction by the second user with the first contact group took place within a first time period, to a second value, when the respective electronic interaction by the second user with the first contact group took place after a second time period.

8. The method of claim 6, wherein the decayed interaction value decreases at a variable rate over time.

9. The method of claim 1, wherein the plurality of historical electronic interactions comprises posting a message or media to the social network, replying to a post on the social network, commenting on a post on the social network, clicking a user interface button to indicate a preference for a particular post on the social network, replying to an email, forwarding an email, sending an instant message, receiving an instant message, participating in an IP based video conference, sharing an electronic file over an Internet connection, or adding a contact to the social network.

10. The method of claim 1, wherein notifying the first user of the contact group suggestion includes providing a pop-up window to the first user that includes the contact group suggestion, presenting the contact group suggestion in a designated window or area of a window, providing the contact group suggestion in a message or email to the first user, presenting the contact group suggestion in text, or presenting the contact group suggestion graphically.

11. The method of claim 1, wherein calculating a respective score in the plurality of scores for a contact group i in the plurality of contact groups with respect to the second user j comprises computing:

$$\text{score}_{ij} = \text{RCGS}_{ij} - w_{ij}\text{IRC}_{ij}$$

wherein
  $\text{score}_{ij}$ is the respective score for the contact group i with respect to the second user j,
  $\text{RCGS}_{ij}$ is a raw contact group score for the contact group i with respect to the second user j,
  $\text{IRC}_{ij}$ is an implicit rejection count for the contact group i with respect to the second user j, and
  $w_{ij}$ is an implicit rejection multiplier for $\text{IRC}_{ij}$.

12. The method of claim 1, further comprising: verifying, at a time prior to notifying the first user of the contact group suggestion, that the first user has not received a contact group suggestion that comprises an invitation to add the second user to the first contact group.

13. The method of claim 1, further comprising: repeating the scoring, determining, generating, and notifying for each second user in a plurality of second users.

14. The method of claim 1, the method further comprising automatically creating the first contact group.

15. The method of claim 14, wherein the first contact group is automatically created based upon a user profile of the first user.

16. A computing system for generating a contact group suggestion for a first user comprising:
  one or more processors;
  memory storing one or more programs be executed by the one or more processor; and
  the one or more programs for execution by the one or more processors, wherein the one or more programs comprises instructions for:
    identifying, using a plurality of historical electronic interactions associated with the first user, a plurality of contact groups identified from contacts in a contact group database, wherein the first user is associated with each contact group in the plurality of contact groups and wherein at least one contact group in the plurality of contact groups was created automatically without explicit instruction from the first user;
    calculating a respective score, with respect to a second user obtained from a contact database, for each respective contact group in the plurality of contact groups, based on an amount of historical electronic interaction between the second user and members of the respective contact group recorded in a historical interactions database thereby deriving a plurality of scores, wherein
      the first user and the second user are each members of a social network, and
      the amount of historical electronic interaction between the second user and members of the respective contact group is determined, at least in part, by a number of times the first user has electronically interacted with the combination of the second user and members of the respective contact group;
      the score for a respective contact group in the plurality of contact groups is decreased by an amount when the first user has been presented with a suggestion to add the second user to the respective contact group on a previous occasion;
    determining a first contact group in the plurality of contact groups, wherein the first contact group has a first score in the plurality of scores that satisfies a predetermined threshold;
    generating a contact group suggestion, responsive to the determining, that comprises an invitation to add the second user to the first contact group, wherein, at a time prior to the generating, the second user is not a member of the first contact group; and
    electronically notifying the first user of the contact group suggestion.

17. The system of claim 16, wherein the one or more program further comprise instructions for:
  forming a plurality of implicit groups from the plurality of historical electronic interactions, wherein each respective implicit group in the plurality of implicit groups comprises the second user and a respective third user in the social network.

18. The system of claim 16, wherein the determining further comprises: verifying that the first contact group includes a user, other than the first user and second user, that is also in an implicit group in the plurality of implicit groups.

19. A non-transitory computer readable storage medium storing one or more programs, the one or more programs comprising instructions, which when executed by a computing system with one or more processors, cause the computing system to execute a method of:
  identifying, using a plurality of historical electronic interactions associated with the first user, a plurality of contact groups identified from contacts in a contact group database, wherein the first user is associated with each contact group in the plurality of contact groups and wherein at least one contact group in the plurality of contact groups was created automatically without explicit instruction from the first user;

calculating a respective score, with respect to a second user obtained from a contact database, for each respective contact group in the plurality of contact groups, based on an amount of historical electronic interaction between the second user and the respective contact group recorded in a historical interactions database thereby deriving a plurality of scores, wherein the first user and the second user are each members of a social network, and the amount of historical electronic interaction between the second user and members of the respective contact group is determined, at least in part, by a number of times the first user has electronically interacted with the combination of the second user and members of the respective contact group, thereby deriving a plurality of scores;

the score for a respective contact group in the plurality of contact groups is decreased by an amount when the first user has been presented with a suggestion to add the second user to the respective contact group on a previous occasion;

determining a first contact group in the plurality of contact groups, wherein the first contact group has a first score in the plurality of scores that satisfies a predetermined threshold;

generating a contact group suggestion, responsive to the determining, that comprises an invitation to add the second user to the first contact group, wherein, at a time prior to the generating, the second user is not a member of the first contact group; and electronically notifying the first user of the contact group suggestion.

20. The non-transitory computer readable storage medium of claim 19, wherein the one or more program further comprise instructions for:

forming a plurality of implicit groups from the plurality of historical electronic interactions, wherein each respective implicit group in the plurality of implicit groups comprises the second user and a respective third user in the social network.

21. The non-transitory computer readable storage medium of claim 19, wherein the determining further comprises: verifying that the first contact group includes a user, other than the first user and second user, that is also in an implicit group in the plurality of implicit groups.

* * * * *

UNITED STATES PATENT AND TRADEMARK OFFICE
CERTIFICATE OF CORRECTION

PATENT NO. : 9,773,229 B2
APPLICATION NO. : 14/069924
DATED : September 26, 2017
INVENTOR(S) : Merom et al.

Page 1 of 1

It is certified that error appears in the above-identified patent and that said Letters Patent is hereby corrected as shown below:

In the Claims

Claim 1, Column 32, Line 12, please delete "one of more" and insert --one or more--;

Claim 20, Column 36, Line 13, please delete "more program further" and insert --more programs further--.

Signed and Sealed this
Fifth Day of December, 2017

Joseph Matal
*Performing the Functions and Duties of the
Under Secretary of Commerce for Intellectual Property and
Director of the United States Patent and Trademark Office*